US012692144B2

(12) United States Patent
Kim et al.

(10) Patent No.: US 12,692,144 B2
(45) Date of Patent: Jul. 28, 2026

(54) WATER PURIFIER AND METHOD FOR CONTROLLING THE SAME

(71) Applicant: SAMSUNG ELECTRONICS CO., LTD., Suwon-si (KR)

(72) Inventors: Seokuk Kim, Suwon-si (KR); Junggeun Lee, Suwon-si (KR); Seonjeong Lee, Suwon-si (KR); Doyun Jang, Suwon-si (KR); Bumseup Kim, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 139 days.

(21) Appl. No.: 18/884,638

(22) Filed: Sep. 13, 2024

(65) Prior Publication Data

US 2025/0145444 A1 May 8, 2025

Related U.S. Application Data

(63) Continuation of application No. PCT/KR2024/012419, filed on Aug. 21, 2024.

(30) Foreign Application Priority Data

Nov. 6, 2023 (KR) ........................ 10-2023-0152180

(51) Int. Cl.
*B67D 1/08* (2006.01)

(52) U.S. Cl.
CPC ......... *B67D 1/0801* (2013.01); *B67D 1/0862* (2013.01); *B67D 2210/0001* (2013.01)

(58) Field of Classification Search
CPC ................ B67D 1/0801; B67D 1/0862; B67D 2210/0001; B67D 2001/1263; B67D 2210/00013; B67D 2210/00118; B67D 1/0009; B67D 1/07; B67D 1/0888
See application file for complete search history.

(56) References Cited

U.S. PATENT DOCUMENTS 8,708,193 B1 * 4/2014 Davis ...................... G07F 9/105 221/150 R
10,167,208 B2 1/2019 Lee et al.
(Continued)

FOREIGN PATENT DOCUMENTS

CN 106397614 A * 2/2017 ............ C08B 30/04
JP 2005-22690 1/2005
(Continued)

OTHER PUBLICATIONS

International Search Report dated Dec. 12, 2024 for International Application No. PCT/KR2024/012419.
(Continued)

*Primary Examiner* — Bob Zadeh
(74) *Attorney, Agent, or Firm* — STAAS & HALSEY LLP

(57) ABSTRACT

A water purifier may include a water tank divided into a first water tank in which water is storable and a second water tank in which water is storable; a water temperature regulator positioned between the first water tank and the second water tank so as to contact water stored in the first water tank and water stored in the second water tank, and configured to change a temperature of the water stored in the first water tank and a temperature of the water stored in the second water tank; a first water outlet valve configured to output the water stored in the first water tank; and a second water outlet valve configured to output the water stored in the second water tank.

14 Claims, 16 Drawing Sheets

(56) References Cited

U.S. PATENT DOCUMENTS

| | | | | |
|---|---|---|---|---|
| 11,465,895 | B2 | 10/2022 | Lee et al. | |
| 2004/0134647 | A1* | 7/2004 | Sienel | F28D 20/0039 165/10 |
| 2011/0289947 | A1* | 12/2011 | Chadwell | B67D 1/0862 700/282 |
| 2016/0222831 | A1* | 8/2016 | Tanaka | C02F 1/46104 |
| 2018/0105410 | A1* | 4/2018 | Kim | F25D 31/006 |
| 2018/0265376 | A1* | 9/2018 | Kim | C02F 1/02 |
| 2019/0262526 | A1* | 8/2019 | Wyeth | A61M 1/287 |
| 2022/0402681 | A1 | 12/2022 | Kim et al. | |
| 2023/0261308 | A1* | 8/2023 | Pannala | H01M 50/103 429/72 |
| 2025/0145444 | A1* | 5/2025 | Kim | B67D 1/0801 |

FOREIGN PATENT DOCUMENTS

| | | | | | |
|---|---|---|---|---|---|
| KR | 20-0288720 | Y1 | | 9/2002 | |
| KR | 10-0830684 | B1 | | 5/2008 | |
| KR | 10-2008-0081133 | A | | 9/2008 | |
| KR | 10-2008-0095819 | A | | 10/2008 | |
| KR | 10-2010-0055598 | | | 5/2010 | |
| KR | 20110022984 | A | * | 3/2011 | F28D 20/00 |
| KR | 10-1098191 | B1 | | 12/2011 | |
| KR | 10-2012-0076819 | | | 7/2012 | |
| KR | 2012076819 | A | * | 7/2012 | |
| KR | 10-2013-0127187 | A | | 11/2013 | |
| KR | 101405521 | B1 | * | 6/2014 | F25B 30/06 |
| KR | 10-1433205 | B1 | | 8/2014 | |
| KR | 10-1439831 | B1 | | 9/2014 | |
| KR | 10-1456069 | B1 | | 10/2014 | |
| KR | 10-2016-0066389 | | | 6/2016 | |
| KR | 10-2016-0097908 | | | 8/2016 | |
| KR | 10-2247221 | B1 | | 5/2021 | |
| KR | 10-2021-0070840 | A | | 6/2021 | |

OTHER PUBLICATIONS

Written Opinion of the International Searching Authority dated Dec. 12, 2024 for International Application No. PCT/KR2024/012419.

* cited by examiner

WATER PURIFIER AND METHOD FOR CONTROLLING THE SAME

CROSS-REFERENCE TO RELATED APPLICATIONS

This is a continuation application, under 35 U.S.C. § 111(a), of International Application No. PCT/KR2024/012419, filed Aug. 21, 2024, which claims priority under 35 U.S.C. § 119 to Korean Patent Application No. 10-2023-0152180, filed Nov. 6, 2023, in the Korean Intellectual Property Office, the disclosures of which are incorporated herein in their entireties by reference.

TECHNICAL FIELD

The disclosure relates to a water purifier that may automatically clean an inner space and supply water to a user in response to user input, and a method for controlling the same.

BACKGROUND ART

A water purifier is a device that filters raw water supplied from the outside and provides the filtered purified water to users as drinking water.

The water purifier may include at least one filter filtering raw water, a plurality of passages through which raw water or purified water flows, a water tank storing purified water, valves controlling the flow of raw water or purified water, and the like.

The water tank may be classified into a purified water tank storing purified water at room temperature according to the temperature of the purified water, a cold water tank cooling and storing purified water, and a hot water tank heating and storing purified water.

Existing water purifiers include a single tank for each target temperature of purified water. For example, existing water purifiers include a single cold water tank that cools a water temperature below a target temperature and stores the cooled water.

Existing water purifiers require a predetermined amount of time to cool purified water supplied again to a cold water tank below a target temperature after providing a large amount of cold water stored in the cold water tank to a user. Accordingly, the existing water purifiers provide the user with cold water that has not reached the target temperature in a case where a water output command is input before the purified water reaches the target temperature.

Furthermore, in a case where a water purifier is used for a long time, foreign substances may be trapped in a water tank or microorganisms may form and adhere to an inner wall of the tank, causing a disruption in the flow of purified water inside the water purifier and providing contaminated purified water to users.

Accordingly, technologies for cleaning a water tank of a water purifier have recently been researched and developed. However, a water purifier with such cleaning technologies may not provide a user with purified water while the inside of the water tank is being cleaned.

DISCLOSURE

Technical Problem

It is an aspect of the disclosure to provide a water purifier including a water tank whose inner space is divided into two water tanks by a water temperature regulator, and supplying water from one water tank to a user based on at least one of water levels or water temperatures of the two water tanks, and a method for controlling the same.

It is another aspect of the disclosure to provide a water purifier that may supply water from one water tank to a user while another water tank of two water tanks is being cleaned, and may control the cleaning of the one water tank based on completion of cleaning of the other water tank, and a method for controlling the same.

Technical Solution

According to an aspect of the disclosure, a water purifier may include: a water tank divided into a first water tank in which water is storable and a second water tank in which water is storable; a water temperature regulator positioned between the first water tank and the second water tank so as to contact water stored in the first water tank and water stored in the second water tank, and configured to change a temperature of the water stored in the first water tank and a temperature of the water stored in the second water tank; a first water outlet valve configured to output the water stored in the first water tank; and a second water outlet valve configured to output the water stored in the second water tank.

The water temperature regulator of the water purifier according to an aspect of the disclosure may include a refrigeration cycle including a compressor, an evaporator, an expansion valve, and a condenser.

The water temperature regulator of the water purifier according to an aspect of the disclosure may include a first cooling plate positioned so as to contact the water stored in the first water tank, a second cooling plate positioned so as to contact the water stored in the second water tank, and a thermoelectric element configured to transfer heat to the first cooling plate and the second cooling plate.

The water purifier according to an aspect of the disclosure may further include a first agitator configured to agitate the water stored in the first water tank; and a second agitator configured to agitate the water stored in the second water tank.

The water purifier according to an aspect of the disclosure may further include a sterilizer configured to sterilize water; a sterilization valve connected to the sterilizer; a first water outlet passage connected to the first water tank; a second water outlet passage connected to the second water tank; a connection passage connecting the first water outlet passage and the second water outlet passage; and a drain valve connected between the connection passage and a drain pipe and configured to be opened in response to cleaning of one of the first water tank and the second water tank.

The water purifier according to an aspect of the disclosure may further include: a filter configured to filter water and supply the filtered water to at least one of the first water tank and the second water tank; a first water inlet passage connected to the first water tank; a second water inlet passage connected to the second water tank; and a water inlet valve connected to the first water inlet passage, the second water inlet passage, and the filter.

According to another aspect of the disclosure, a water purifier may include: an input portion; and a processor configured to: based on receiving a water outlet command from the input interface while one water tank of the first water tank and the second water tank is being cleaned and another water tank of the first water tank and the second water tank is not being cleaned, open one of the first water outlet valve and the second water outlet valve which is configured to output the water stored in the another water tank.

The water purifier according to another aspect of the disclosure may further include: a sterilizer configured to sterilize water; a sterilization valve connected to the sterilizer; a first water outlet passage connected to the first water tank; a second water outlet passage connected to the second water tank; a connection passage connecting the first water outlet passage and the second water outlet passage; and a drain valve connected between the connection passage and a drain pipe, wherein the processor of the water purifier according to another aspect of the disclosure may be configured to: open one of the first water outlet valve and the second water outlet valve which is configured to output the water stored in the one water tank and the drain valve to discharge the water stored in the out water tank, based on the water stored in the one water tank being discharged from the one water tank, open the sterilization valve to supply the sterilized water from the sterilizer to the one water tank, and based on the sterilized water being supplied to the one water tank, close the one of the first water outlet valve and the second water outlet valve which is configured to output the water stored in the one water tank and the drain valve to store the sterilized water in the one water tank for a preset time to clean the one water tank.

The processor of the water purifier according to another aspect of the disclosure may be configured to: based on an elapse of a reference time since the one water tank was cleaned, perform control to clean the another water tank.

The water purifier according to another aspect of the disclosure may further include: a first temperature sensor configured to detect a first temperature of the water of the first water tank; and a second temperature sensor configured to detect a second temperature of the water of the second water tank, wherein the processor of the water purifier according to another aspect of the disclosure may be further configured to: based on receiving the water outlet command from the input interface while the first water tank and the second water tank are not being cleaned, identify which of the first water tank and the second water tank contains water of a lower temperature by comparing the first temperature to the second temperature, and open one of the first water outlet valve and the second water outlet valve which is configured to output the water stored in the identified water tank.

The water purifier according to another aspect of the disclosure may further include: a first water level sensor configured to detect a first water level of the first water tank; and a second water level sensor configured to detect a second water level of the second water tank, wherein the processor of the water purifier according to another aspect of the disclosure may be configured to: based on receiving the water outlet command from the input interface while the first water tank and the second water tank are not being cleaned, identify which of the first water tank and the second water tank has a higher water level by comparing the first water level to the second water level, and open one of the first water outlet valve and the second water outlet valve which is configured to output the water stored in the identified water tank to output water from the identified water tank.

The water purifier according to another aspect of the disclosure may further include: a filter configured to filter water and supply the filtered water to at least one of the first water tank and the second water tank; a first water inlet passage connected to the first water tank; a second water inlet passage connected to the second water tank; and a water inlet valve connected to the first water inlet passage, the second water inlet passage, and the filter, and a drain valve configured to drain at least one of the first water tank and the second water tank, wherein the processor of the water purifier according to another aspect of the disclosure may be configured to: based on the one water tank being cleaned, open the water inlet valve to supply the filtered water to the one water tank, and open one of the first water outlet valve and the second water outlet valve which is configured to output the water stored in the another water tank and the drain valve to discharge the water stored in the another water tank, and based on the water stored in the another water tank being discharged from the another water tank, open the water inlet valve to supply the filtered water to the another water tank.

The water temperature regulator of the water purifier according to an aspect of the disclosure may divide the water tank into the first water tank and the second water tank.

The water purifier according to another aspect of the disclosure may further include: a filter configured to filter raw water and supply the filtered water to the first water tank and the second water tank; a first water inlet passage configured to be connected to the first water tank; a second water inlet passage configured to be connected to the second water tank; and a water inlet valve configured to be connected to the first water inlet passage, the second water inlet passage, and the filter. The processor of the water purifier according to another aspect of the disclosure may be configured to control the water inlet valve to be opened to allow the water filtered by the filter to be supplied to the other water tank, in response to completion of the output of the water of the other water tank.

According to still another aspect of the disclosure, a method for controlling a water purifier including a water tank divided into a first water tank in which water is storable and a second water tank in which water is storable, a water temperature regulator positioned between the first water tank and the second water tank so as to contact water stored in the first water tank and water stored in the second water tank and configured to change a temperature of the water stored in the first water tank and a temperature of the water stored in the second water tank, a first water outlet valve configured to output the water stored in the first water tank, and a second water outlet valve configured to output the water stored in the second water tank, may include: based on receiving a water outlet command from an input interface and determining that the first water tank is being cleaned and the second water tank is not being cleaned, opening the second water outlet valve to output the water stored in the second water tank; based on the water stored in the second water tank being output, opening a water inlet valve to supply water to the second water tank; based on water being supplied to the second water tank, cooling the water stored in the second water tank with the water temperature regulator; and based on an elapse of a reference time since the first water tank was cleaned, controlling the second water tank to be cleaned, wherein a temperature of the water stored in the first water tank and a temperature of the water stored in the second water tank may be adjusted to an identical or similar temperature by the water temperature regulator.

The method according to still another aspect of the disclosure, wherein the water purifier further includes a drain valve configured to discharge the water stored in at least one of the first water tank and the second water tank, a sterilizer configured to sterilize water, a sterilization valve connected to the sterilizer, a filter configured filter water and supply the filtered water to at least one of the first water tank and the second water tank, may further include: cleaning the first water tank by: opening the first water outlet valve and the drain valve to discharge the water stored in the first water tank, based on the water stored in the first water tank being discharged, closing the first water outlet valve and the drain valve, controlling the sterilizer to sterilize water, after the first outlet valve is closed, opening the sterilization valve to supply the sterilized water to the first water tank, opening the first water outlet valve and the drain valve to discharge the sterilized water from the first water tank; and based on the first water tank being cleaned, opening the water inlet valve to supply water filtered by the filter to the first water tank; and cooling the water stored in the first water tank with the water temperature regulator.

The method according to still another aspect of the disclosure may further include controlling the second water tank to be cleaned in response to an elapse of a reference time since the cleaning of the first water tank was completed.

The method according to still another aspect of the disclosure, wherein the water purifier further includes a first water level sensor configured to detect a first water level of the first water tank, and a second water level sensor configured to detect a second water level of the second water tank, a first temperature sensor configured to detect a first temperature of the water of the first water tank, and a second temperature sensor configured to detect a second temperature of the water of the second water tank, may further include, based on receiving the water outlet command from the input interface and determining that the first water tank and the second water tank are not being cleaned, detecting the first water level and the second water level, based on the detected first water level and the detected second water level, identifying which water tank of the first water tank and the second water tank has a water level that is greater than or equal to a reference water level, outputting water stored in the identified water tank, based on determining that both the first water level and the second water level are greater than or equal to the reference water level, detecting the first temperature and the second temperature, identifying which water tank of the first water tank and the second water tank is storing water of a lower temperature, and outputting the water stored in the water tank identified as storing water of the lower temperature.

The method according to still another aspect of the disclosure may further include controlling the water temperature regulator to cool the water of the second water tank, based on the supply of water to the second water tank.

Advantageous Effects

According to the disclosure, an inner space of a single water tank may be divided using a water temperature regulator, thereby forming two water tanks in the single water tank.

According to the disclosure, water temperatures of the two water tanks may be adjusted using a single water temperature regulator, and water may be provided to a user from one of the two water tanks while the other is being cleaned, thereby enabling water to be provided to the user at any time the user desires and improving user satisfaction. According to the disclosure, temperatures of water in the two water tanks may be similarly or equally adjusted using two water temperature regulators provided in each of the two water tanks, and water from one of the two water tanks may be provided to a user based on at least one of water levels or water temperatures of the two water tanks, or water from a water tank corresponding to a user input may be provided to the user.

According to the disclosure, water may be provided to a user from one of the two water tanks based on at least one of water levels or water temperatures of the two water tanks, thereby providing the user with water at a temperature desired by the user.

According to the disclosure, one of the two water tanks may be automatically cleaned after cleaning of the other of the two water tanks is complete, the water purifier may be kept hygienic, clean water may be provided to a user, and user convenience may be improved.

According to the disclosure, the quality and productivity of water purifier may be improved, safety of the water purifier may also be improved, and competitiveness of the water purifier may be enhanced.

MODES OF THE DISCLOSURE

Figure 1:
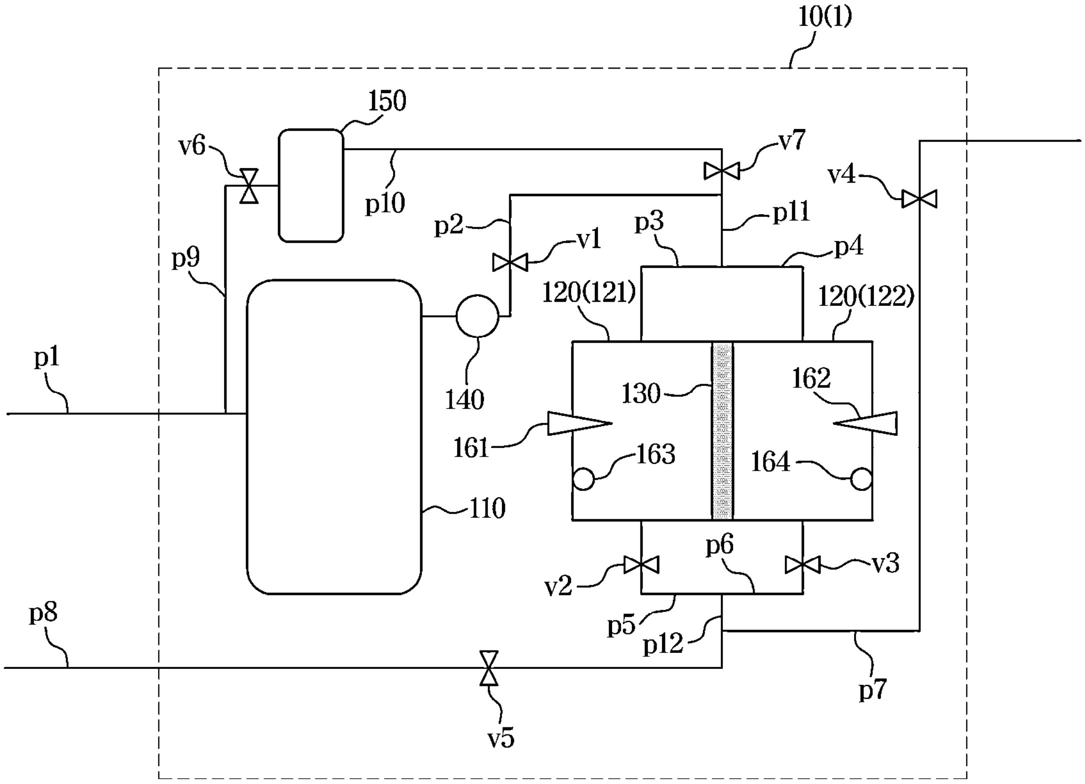
FIG. 1 is a diagram illustrating a configuration of a water purifier according to an embodiment.

Embodiments described in the specification and configurations shown in the accompanying drawings are merely examples of the disclosure, and various modifications may replace the embodiments and the drawings of the disclosure at the time of filing of the application.

In the description of the drawings, like numbers refer to like elements throughout the description of the drawings.

The singular forms corresponding to an item are intended to include the plural forms unless the context clearly indicates otherwise.

In the disclosure, a phrase such as “A or B,” “at least one of A and B,” “at least one of A or B,” “A, B or C,” “at least one of A, B and C,” and “at least one of A, B, or C” may include any one of the items listed together in the corresponding phrase of the phrases, or any possible combination thereof.

The term “and/or” includes combinations of one or all of a plurality of associated listed items.

As used herein, such terms as “first” and “second” may be used to simply distinguish a corresponding component from another, and does not limit the components in other aspect (for example, importance or order).

When one (e.g., a first) element is referred to as being "coupled" or "connected" to another (e.g., a second) element with or without the term "functionally" or "communicatively," it refers to that the one element is connected to the other element directly, wirelessly, or via a third element.

It will be understood that the terms "include", "comprise" and/or "have" when used in this disclosure, specify the presence of stated features, integers, steps, operations, elements, and/or components, but do not preclude the presence or addition of one or more other features, integers, steps, operations, elements, components, and/or groups thereof.

It is to be understood that if a certain component is referred to as being "coupled with," "coupled to," "supported on" or "in contact with" another component, it refers to that the component may be coupled with the other component directly or indirectly via a third component.

It will be understood that, when an element is referred to as being "on/over" another element, it may be directly on/under the other element, or one or more elements may also be present.

A water purifier may include at least one filter filtering raw water, a plurality of passages through which raw water or purified water flows, at least one water tank storing water, a plurality of valves controlling the flow of water, and the like.

The water purifier may include at least one of a purified water tank storing purified water at room temperature, a cold water tank cooling and storing purified water, or a hot water tank heating and storing purified water.

The water purifier may include a control panel disposed on a side of a housing. The control panel may provide a user interface for interaction between a user and the water purifier. The user interface may include at least one input interface and at least one output portion.

The at least one input interface may convert sensory information received from a user into an electrical signal.

The at least one input interface may include a power button, a cold water outlet button, a purified water outlet button, a hot water outlet button, and a cleaning button. The at least one input interface may include, for example, a tact switch, a push switch, a slide switch, a toggle switch, a micro switch, a touch switch, a touch pad, a touch screen, a jog dial, and/or a microphone.

The at least one output interface may visually or audibly convey information related to operations of the water purifier to a user.

For example, the at least one output interface may convey information related to cleaning and water outlet to the user. Information about the operation of the water purifier may be output through a screen, an indicator, voice, or the like. The at least one output interface may include, for example, a display, a speaker, or the like.

The water purifier may include a communication module for wired and/or wireless communication with an external device.

The communication module may include at least one of a short-range wireless communication module or a long-range wireless communication module.

The communication module may transmit data to an external device (e.g., a server, a user device, and/or a home appliance) or receive data from the external device. For example, the communication module may establish communication with a server and/or a user device and/or a home appliance, and transmit and receive various types of data.

For the communication, the communication module may establish a direct (e.g., wired) communication channel or a wireless communication channel between external devices, and support the performance of the communication through the established communication channel.

According to an embodiment, the communication module may include a wireless communication module (e.g., a cellular communication module, a short-range wireless communication module, or a global navigation satellite system (GNSS) communication module) or a wired communication module (e.g., a local area network (LAN) communication module, or a power line communication module).

Among these communication modules, the corresponding communication module may communicate with an external device through a first network (e.g., a short-range wireless communication network such as Bluetooth, wireless fidelity (Wi-Fi) direct, or infrared data association (IrDA)) or a second network (e.g., a long-range wireless communication network such as a legacy cellular network, a 5G network, a next-generation communication network, the Internet, or a computer network (e.g., LAN or WAN)). These various types of communication modules may be integrated as one component (e.g., a single chip) or implemented as a plurality of separate components (e.g., multiple chips).

The short-range wireless communication module may include a Bluetooth communication module, a Bluetooth Low Energy (BLE) communication module, a near field communication module, a WLAN (Wi-Fi) communication module, a Zigbee communication module, an Infrared Data Association (IrDA) communication module, a Wi-Fi Direct (WFD) communication module, an ultrawideband (UWB) communication module, an Ant+ communication module, a microwave (uWave) communication module, etc., but is not limited thereto.

The long-range wireless communication module may include a communication module that performs various types of long-range wireless communication, and may include a mobile communication circuitry. The mobile communication circuitry transmits and receives radio signals with at least one of a base station, an external terminal, or a server on a mobile communication network.

According to an embodiment, the communication module may communicate with an external device such as a server, a user device and other home appliances through an access point (AP). The access point (AP) may connect a local area network (LAN), to which a water purifier or a user device is connected, to a wide area network (WAN) to which a server is connected.

The water purifier or the user device may be connected to the server through the wide area network (WAN). A controller may control various components (e.g., valve) of the water purifier.

The controller may control various components of the water purifier to perform at least one operation including water outlet and cleaning according to a user input.

The controller may include hardware such as a Central Processing Unit (CPU) or memory, and software such as a control program. For example, the controller may include at least one memory for storing an algorithm and program-type data for controlling the operation of components in the water purifier, and at least one processor configured to perform the above-described operation by using the data stored in the at least one memory.

The processor may include a separate Neural Network Processing Unit (NPU) that performs operations of the artificial intelligence model. In addition, the processor may include a central processing unit, a Graphic Processor Unit (GPU), and the like.

The memory and the processor may each be implemented as separate chips. The processor may include one or more processor chips or may include one or more processing cores. The memory may include one or more memory chips or one or more memory blocks. Alternatively, the memory and the processor may be implemented as a single chip.

Hereinafter, a water purifier according to various embodiments of the disclosure will be described in detail with reference to the accompanying drawings.

FIG. 1 is a diagram illustrating a configuration of a water purifier according to an embodiment, and the configuration of the water purifier is described in detail with reference to FIG. 2, FIG. 3, FIG. 4, FIG. 5, FIG. 6 and FIG. 7.

Figure 2A:
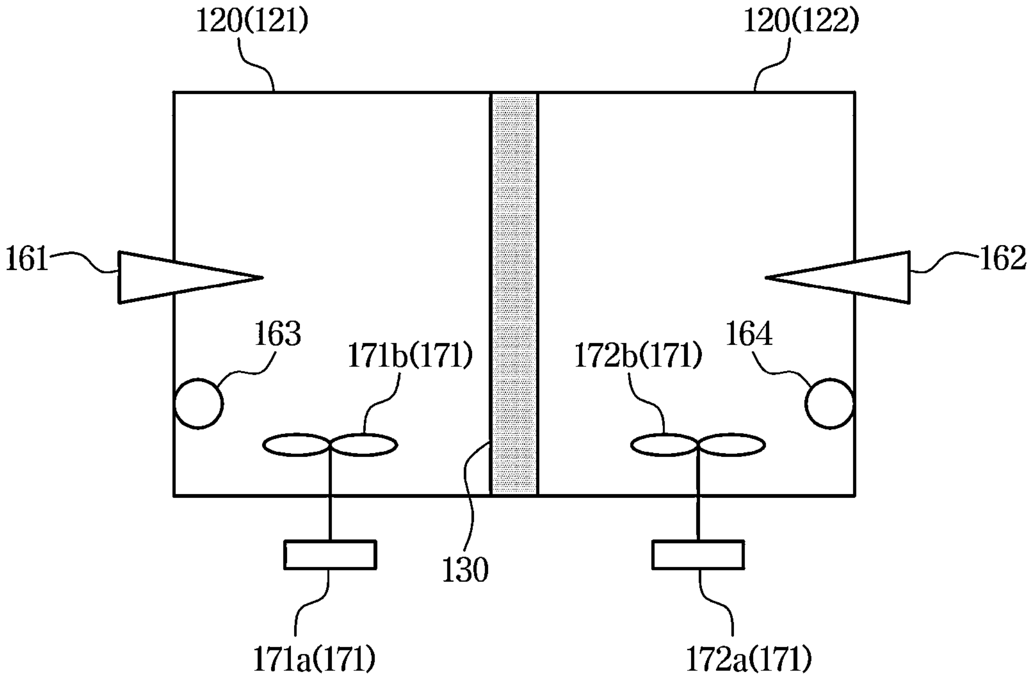
FIG. 2A is a view illustrating an example water tank of a water purifier according to an embodiment.
Figure 2B:
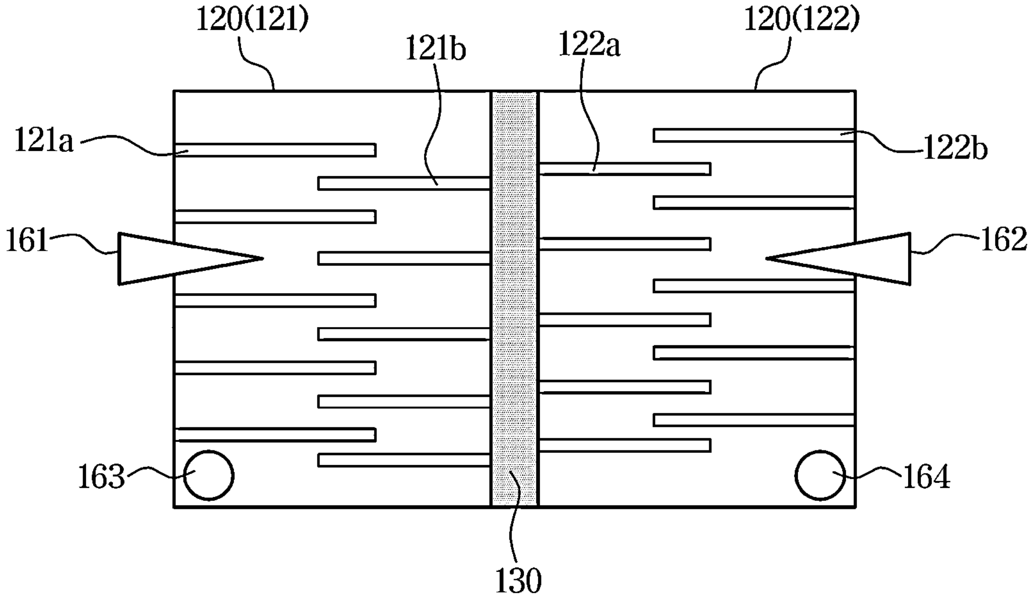
FIGS. 2B, 2C, and 2D are views illustrating modified example water tanks of a water purifier according to an embodiment.
Figure 2C:
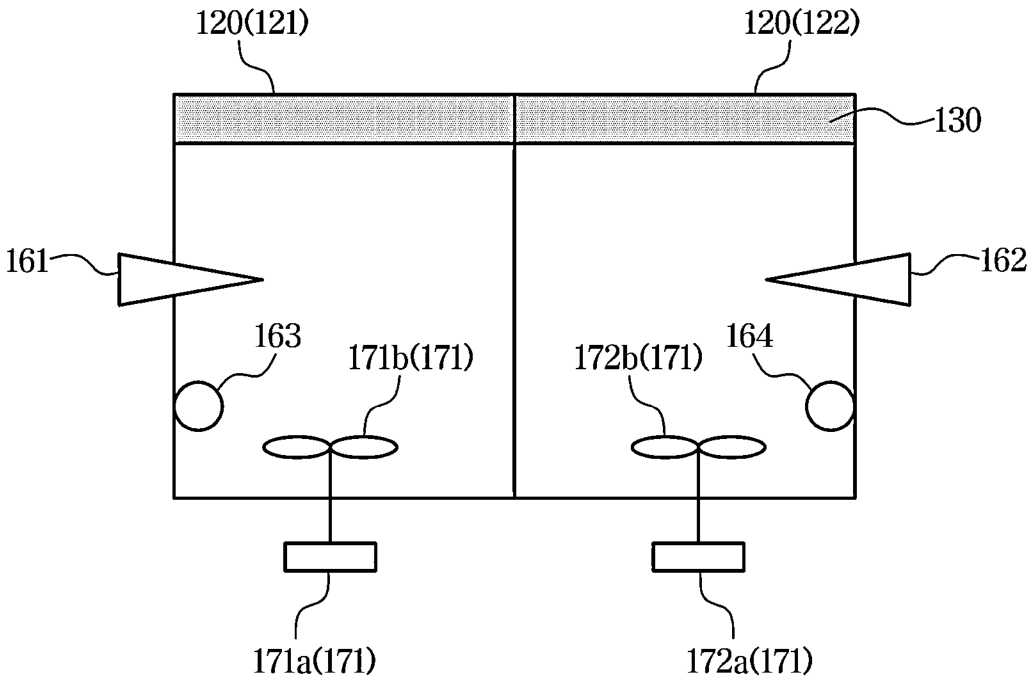
Figure 2D:
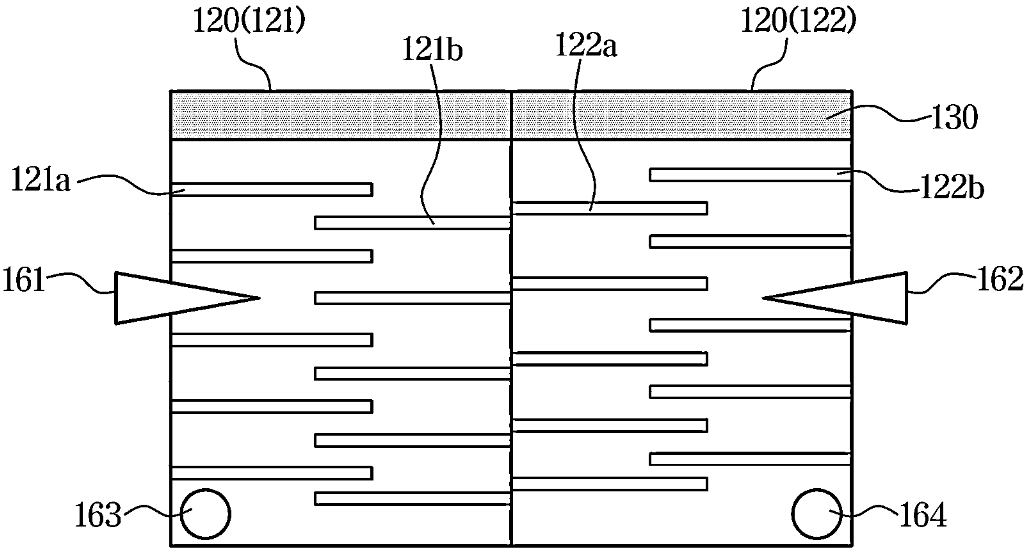

FIG. 2A is a view illustrating an example water tank of a water purifier according to an embodiment. FIGS. 2B, 2C, and 2D are views illustrating modified example water tanks of a water purifier according to an embodiment. FIG. 3, FIG. 4, FIG. 5, FIG. 6 and FIG. 7 are views illustrating example water temperature regulators of a water purifier according to an embodiment.

The water purifier 1 may include a housing 10 forming an exterior.

The water purifier 1 may include a filter 110, a water tank 120, a water temperature regulator 130, a flowmeter 140, and a sterilizer 150 in the housing 10.

The filter 110 may remove odors and foreign substances from raw water, and transfer purified water from which odors and foreign substances have been removed to the water tank 120. The filter 110 may transfer the purified water to a first water tank 121 or a second water tank 122 of the water tank 120.

A single filter 110 or a plurality of filters 110 may exist.

The filter 110 may include at least one of a sediment filter that removes dust, debris, contaminants, and other particles larger than 0.5 microns upon initial contact with raw water, a pre-carbon filter that adsorbs and removes harmful chemicals, organic chemicals, and the like, dissolved in raw water using heat-treated carbon, or a Reverse Osmosis Filter (RO filter) that not only removes free residual chlorine, color, turbidity, chloroform, microorganisms, and bacteria from raw water, but also removes organic compounds, pesticides, heavy metals, and inorganic ions for specialized water purification, allowing only pure water to pass through. Here, pure water may be purified water.

Water that does not pass through the RO filter may be discharged to the outside through a drain pipe.

The water tank 120 stores purified water filtered by the filter 110.

The water tank 120 may be a purified water tank that stores the purified water, transferred from the filter 110 at room temperature.

The water tank 120 may be a hot water tank that stores the purified water, transferred from the filter 110, at a first target temperature.

The water tank 120 may be a cold water tank that stores the purified water, transferred from the filter 110, at a second target temperature. Here, the second target temperature may be lower than the first target temperature.

The water tank 120 may be divided into at least two inner spaces by the water temperature regulator 130. The water tank 120 may include a first water tank 121 and a second water tank 122 separated by the water temperature regulator 130.

Temperatures of the purified water stored in the first water tank 121 and the second water tank 122 of the water tank 120 may be identical or similar to each other by the water temperature regulator 130.

The first water tank 121 may store the purified water transferred from the filter 110, may output the stored purified water in response to a water outlet command, and may store purified water transferred from the filter 110 again after outputting the purified water.

The first water tank 121 may discharge the stored purified water for cleaning, store sterilized water transferred from the sterilizer 150, discharge the stored sterilized water in response to completion of cleaning, and store purified water transferred from the filter 110 after cleaning.

The second water tank 122 may store purified water transferred from the filter 110, output the stored purified water in response to a water outlet command, and store purified water transferred from the filter 110 again after the purified water is output.

The second water tank 122 may discharge the stored purified water for cleaning, store sterilized water transferred from the sterilizer 150, discharge the stored sterilized water in response to completion of cleaning, and store purified water transferred from the filter 110 after cleaning.

The purified water stored in the first water tank 121 and the second water tank 122 may be heated or cooled by an operation of the water temperature regulator 130.

As shown in FIG. 2A, a first agitator 171 may be positioned in the first water tank 121 to agitate (stir) the purified water stored in the first water tank 121. The first agitator 171 may promote a change in the temperature of the purified water stored in the first water tank 121 and allow the temperature of the stored purified water to be uniform.

The first agitator 171 may include a first agitation motor 171*a* and a first agitation body 171*b*. The first agitation motor 171*a* may be positioned outside the first water tank 121, and the first agitation body 171*b* may be positioned inside the first water tank 121.

The first agitation body 171*b* may include a blade. The first agitation body 171*b* may be connected to a shaft of the first agitation motor 171*a* and may be rotated by receiving a driving force of the first agitation motor 171*a* through the shaft of the first agitation motor 171*a*.

A second agitator 172 may be positioned in the second water tank 122 to agitate the purified water stored in the second water tank 122. The second agitator 172 may promote a change in the temperature of the purified water stored in the second water tank 122 and allow the temperature of the stored purified water to be uniform.

The second agitator 172 may include a second agitation motor 172*a* and a second agitation body 172*b*. The second agitation motor 172*a* may be positioned outside the second water tank 122, and the second agitation body 172*b* may be positioned inside the second water tank 122. The second agitation body 172*b* may include a blade. The second agitation body 172*b* may be connected to a shaft of the second agitation motor 172*a* and may be rotated by receiving a driving force of the second agitation motor 172*a* through the shaft of the second agitation motor 172*a*.

The water temperature regulator 130 may be positioned in the inner space of the water tank 120 and divide the inner space of the water tank 120 into two spaces. The inner space of the water tank 120 may be divided into the first water tank 121 and the second water tank 122 by the water temperature regulator 130.

Water temperatures of the first water tank 121 and the second water tank 122 of the water tank 120 may be adjusted (regulated) by a single water temperature regulator 130. The water temperature of the first water tank 121 and the water temperature of the second water tank 122 of the water tank 120 may be the same or similar.

As shown in FIG. 2B, the first water tank 121 of the water tank 120 may include a plurality of first guide members 121*a* and a plurality of second guide members 121*b*.

The plurality of first guide members 121*a* may be positioned on an inner wall of the first water tank 121, may be positioned on a first wall among a plurality of walls, and may be spaced apart at regular intervals.

The plurality of second guide members 121*b* may be positioned on an inner wall of the first water tank 121, may be positioned on a second wall, and may be spaced apart at regular intervals.

Here, the second wall of the first water tank may face the first wall of the first water tank.

The plurality of first guide members 121*a* spaced apart from each other at regular intervals and the plurality of second guide members 121*b* spaced apart from each other at regular intervals may be positioned at different heights based on a vertical line of the water tank.

The plurality of first guide members 121*a* and the plurality of second guide members 121*b* may each have a width greater than half the width of the first water tank 121.

Portions of each of the plurality of first guide members 121*a* and the plurality of second guide members 121*b* may overlap in the middle area of the first water tank and may be vertically spaced apart from each other.

The plurality of first guide members 121*a* and the plurality of second guide members 121*b* arranged in the first water tank may form a first water tank passage in the first water tank 121 of the water tank 120.

Purified water flowing into (entering) the first water tank may flow along the first water tank passage and may be output to the outside. In this case, the purified water flowing first into the first water tank may be output first from the first water tank, and the purified water flowing last into the first water tank may be output last from the first water tank.

In a case where the water tank is a cold water tank, among the purified water flowing into the first water tank, the purified water entering relatively first may be cooled earlier than the purified water entering last, and may be colder than the purified water entering last. In this case, the water purifier may first output the initially cooled purified water from the first water tank.

In addition, in a case where sterilized water flows into the first water tank, the sterilized water flowing into the first water tank may flow along the first water tank passage and may be output to the outside. In this case, the sterilized water flowing first into the first water tank may be output first from the first water tank, and the sterilized water flowing last into the first water tank may be output last from the first water tank. Accordingly, the sterilized water may be prevented from remaining in the first water tank.

As shown in FIG. 2B, the second water tank 122 of the water tank 120 may include a plurality of third guide members 122*a* and a plurality of fourth guide members 122*b*.

The plurality of third guide members 122*a* may be positioned on an inner wall of the second water tank 122, and may be positioned on a first wall among a plurality of walls, and may be spaced apart at regular intervals.

The plurality of fourth guide members 122*b* may be positioned on an inner wall of the second water tank 122, and may be positioned on a second wall, and may be spaced apart at regular intervals.

Here, the second wall of the second water tank may face the first wall of the second water tank.

The plurality of third guide members 122*a* spaced apart from each other at regular intervals and the plurality of fourth guide members 122*b* spaced apart from each other at regular intervals may be positioned at different heights based on the vertical line of the water tank. The plurality of third guide members 122*a* and the plurality of fourth guide members 122*b* may each have a width greater than half the width of the second water tank 122.

Portions of each of the plurality of third guide members 122*a* and the plurality of fourth guide members 122*b* may overlap in the middle area of the second water tank and may be vertically spaced apart from each other.

The plurality of third guide members 122*a* and the plurality of fourth guide members 122*b* arranged in the second water tank may form a second water tank passage in the second water tank 122 of the water tank 120.

Purified water flowing into (entering) the second water tank may flow along the second water tank passage and may be output to the outside. In this case, the purified water flowing first into the second water tank may be output first from the second water tank, and the purified water flowing last into the second water tank may be output last from the second water tank.

In a case where the water tank is a cold water tank, among the purified water flowing into the second water tank, the purified water entering relatively first may be cooled earlier than the purified water entering last, and may be colder than the purified water entering last. In this case, the water purifier may first output the initially cooled purified water from the second water tank.

In addition, in a case where sterilized water flows into the second water tank, the sterilized water flowing into the second water tank may flow along the second water tank passage and may be output to the outside. In this case, the sterilized water flowing first into the second water tank may be output first from the second water tank, and the sterilized water flowing last into the second water tank may be output last from the second water tank. Accordingly, the sterilized water may be prevented from remaining in the second water tank.

As shown in FIG. 2C, the inner space of the water tank 120 may be divided into first and second water tanks by a partition wall disposed therein. In this case, the water temperature regulator 130 may be positioned on one side of the water tank 120.

The one side of the water tank 120 may be a side formed jointly by the first and second water tanks.

For example, the one side of the water tank may be a side where an inlet is formed, or may be a side where an outlet of the water tank is formed.

In the case of the modified example shown in FIG. 2C, the water purifier may adjust temperatures of the water in the first and second water tanks using a single water temperature regulator 130.

As shown in FIG. 2D, the inner space of the water tank 120 may be divided into the first water tank 121 and the second water tank 122 by a partition wall disposed therein. In this case, the water temperature regulator 130 may be positioned on one side of the water tank 120.

The one side of the water tank 120 may be a side formed jointly by the first and second water tanks.

For example, the one side of the water tank may be a side where an inlet is formed, or may be a side where an outlet of the water tank is formed.

The first water tank 121 may include a first water tank passage formed by the plurality of first guide members 121*a* and the plurality of second guide members 121*b*.

The second water tank 122 may include a second water tank passage formed by the plurality of third guide members 122*a* and the plurality of fourth guide members 122*b*.

The structure of the plurality of first guide members 121*a*, the plurality of second guide members 121*b*, the plurality of third guide members 122*a*, and the plurality of fourth guide members 122*b* are the same as that shown in FIG. 2B, and thus a description thereof is omitted herein.

In the case of the modified example shown in FIG. 2D, the water purifier may adjust temperatures of the water in the first and second water tanks using a single water temperature regulator 130. In addition, the first and second water tanks may output first purified water entering first or sterilized water entering first. Accordingly, sterilized water may be prevented from remaining in the first and second water tanks.

In a case where the water tank is a cold water tank, the first and second water tanks may output purified water cooled earlier through the first and second water passages, respectively.

The water temperature regulator 130 may include a heating portion that emits heat. The heating portion may include one or more heaters, or may include a condenser of a refrigeration cycle. The heater may include a ceramic heater, without being limited thereto.

In a case where the water temperature regulator 130 includes the heating portion, the water temperature regulator may heat purified water stored in the first water tank 121 and the second water tank 122. In this case, the water tank may be a hot water tank, and the purified water stored in the first water tank 121 and the second water tank 122 may be hot water.

The water temperature regulator 130 may include a cooler that absorbs heat. The cooler may include a thermoelectric element or an evaporator of a refrigeration cycle.

In a case where the water temperature regulator 130 includes the cooler, the water temperature regulator 130 may cool the purified water stored in the first water tank 121 and the second water tank 122. In this case, the water tank may be a cold water tank, and the purified water stored in the first water tank 121 and the second water tank 122 may be cold water.

Examples of the water temperature regulator including the cooler are described with reference to FIG. 3, FIG. 4, FIG. 5, FIG. 6, and FIG. 7.

Figure 3:
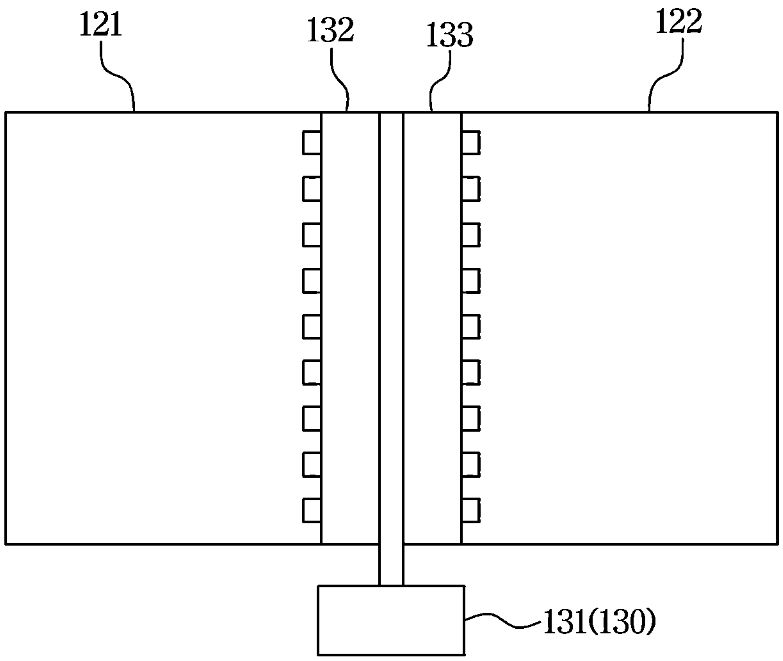
FIG. 3, FIG. 4, FIG. 5, FIG. 6 and FIG. 7 are views illustrating example water temperature regulators of a water purifier according to an embodiment.

As shown in FIG. 3, the water temperature regulator 130 may include a thermoelectric element 131, a first cooling plate 132, and a second cooling plate 133.

In this instance, the first and second cooling plates may be cooled simultaneously using a single thermoelectric element.

The thermoelectric element 131 may emit or absorb heat.

For example, the thermoelectric element 131 may be a device that uses the Peltier effect to absorb heat on a first side and generate heat on a second side depending on a direction of current when direct current electricity is applied. In this case, the thermoelectric element 131 may include first and second ceramic substrates spaced apart at regular intervals, a first conductive substrate disposed on the first ceramic substrate, a second conductive substrate that is disposed on the second ceramic substrate and faces the first conductive substrate, and an n-type semiconductor and a p-type semiconductor disposed between the first and second conductive substrates and electrically connected to each other.

A plurality of n-type semiconductors and p-type semiconductors may be arranged alternately between the first and second conductive substrates.

When electricity is applied, the thermoelectric element 131 absorbs heat or emits heat at a point where the n-type semiconductor and the p-type semiconductor are connected.

The first side of the thermoelectric element 131 may be a side on which the first ceramic substrate is disposed, and may be a cold side that absorbs heat.

The second side of the thermoelectric element 131 may be a side on which the second ceramic substrate is disposed, and may be a hot side that emits heat.

The first cooling plate 132 and the second cooling plate 133 may be positioned on the first side of the thermoelectric element 131.

The first cooling plate 132 and the second cooling plate 133 may receive heat from the thermoelectric element 131. The first cooling plate 132 and the second cooling plate 133 may be cooled by receiving heat from the thermoelectric element 131.

The first cooling plate 132 may be positioned adjacent to the first water tank 121 and may cool the purified water stored in the first water tank 121 using heat transferred from the thermoelectric element 131.

The first cooling plate 132 may form one wall of the first water tank 121.

The second cooling plate 133 may be positioned adjacent to the second water tank and may cool the purified water stored in the second water tank 122 using heat transferred from the thermoelectric element 131.

The second cooling plate 133 may form one wall of the second water tank 122.

The first cooling plate 132 and the second cooling plate 133 may be provided integrally.

Figure 4:
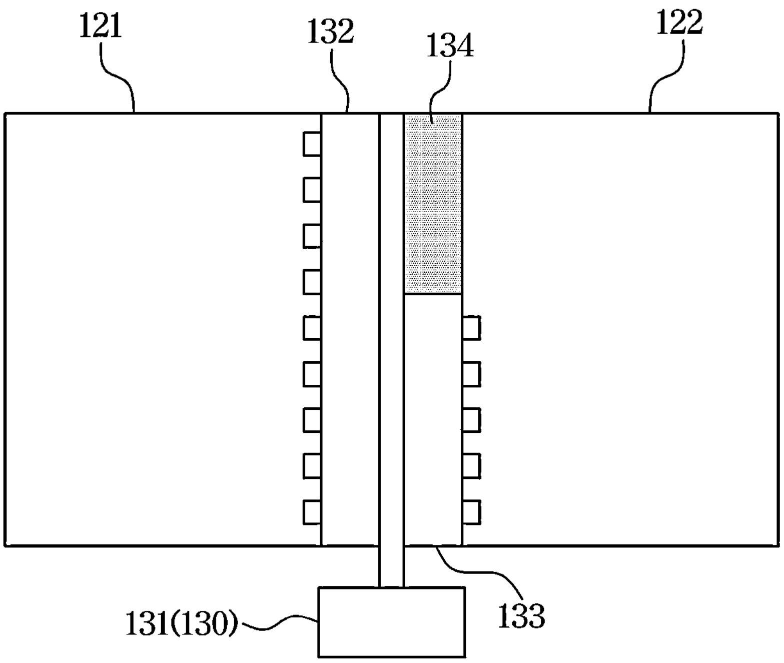

As shown in FIG. 4, the water temperature regulator 130 may include the thermoelectric element 131, the first cooling plate 132, the second cooling plate 133, and a blocking member 134.

When electricity is applied, the thermoelectric element 131 absorbs heat or emits heat at a point where the n-type semiconductor and the p-type semiconductor are connected.

A first side of the thermoelectric element 131 may be a cold side that absorbs heat.

A second side of the thermoelectric element 131 may be a hot side that emits heat.

The first cooling plate 132 and the second cooling plate 133 may be disposed on the first side of the thermoelectric element 131 and may receive heat from the thermoelectric element 131.

The first cooling plate 132 and the second cooling plate 133 may be cooled by receiving heat from the thermoelectric element 131.

The first cooling plate 132 may be positioned adjacent to the first water tank 121 and may cool the purified water stored in the first water tank 121 using heat transferred from the thermoelectric element 131.

The first cooling plate 132 and the second cooling plate 133 may be provided integrally.

The first cooling plate 132 may form one wall of the first water tank 121.

The second cooling plate 133 may be positioned adjacent to the second water tank and may cool the purified water stored in the second water tank 122 using heat transferred from the thermoelectric element 131.

The second cooling plate 133 may form a part of one wall of the second water tank 122. The second cooling plate 133 may have a smaller size than the first cooling plate 132.

The blocking member 134 may be positioned on a remaining part of the one wall of the second water tank 122 to spatially separate the first water tank 121 and the second water tank 122.

The blocking member 134 may be provided integrally with the second cooling plate 133, and may form one wall of the second water tank 122 together with the second cooling plate 133.

A temperature of cold water in the second water tank 122 may be higher than a temperature of cold water in the first water tank 121. In this case, the water purifier 1 may provide a user with cold water of different temperatures. The user may select cold water of a desired temperature and be provided with the cold water of the user's selection.

Figure 5:
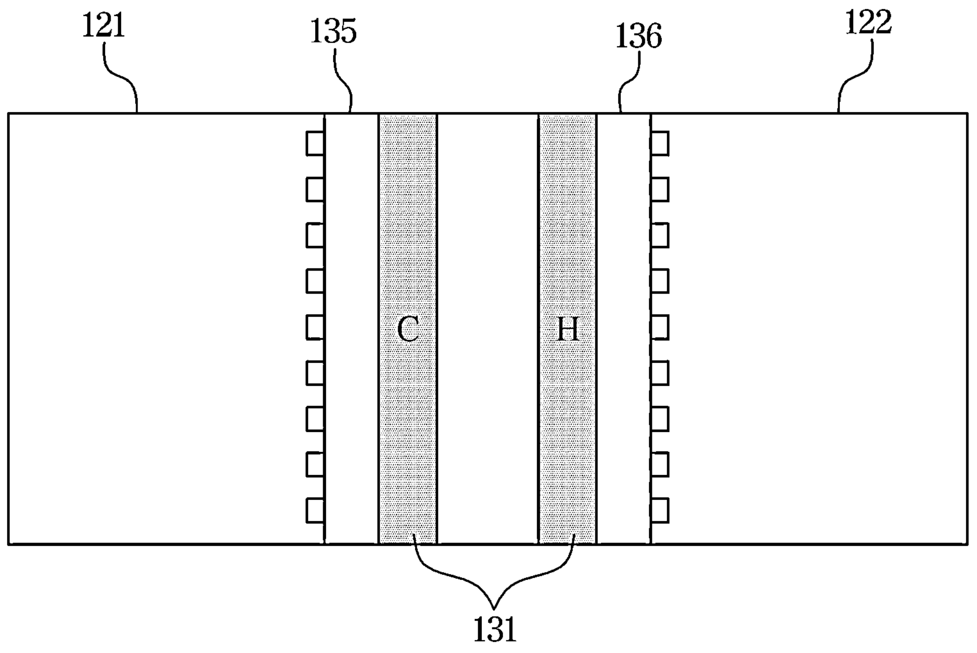

As shown in FIG. 5, the water temperature regulator 130 may include the thermoelectric element 131, a cooling plate 135, and a heat sink 136.

When electricity is applied, the thermoelectric element 131 absorbs heat or emits heat at a point where the n-type semiconductor and the p-type semiconductor are connected.

A first side of the thermoelectric element 131 may be a cold side that absorbs heat.

A second side of the thermoelectric element 131 may be a hot side that emits heat.

The cooling plate 135 may be disposed on the first side of the thermoelectric element 131 and may receive heat from the thermoelectric element 131. The heat transferred from the thermoelectric element 131 to the cooling plate 135 may be low-temperature heat.

The cooling plate 135 may be cooled by heat received from the thermoelectric element 131.

The cooling plate 135 may be positioned adjacent to the first water tank 121 and may cool the purified water stored in the first water tank 121 using heat transferred from the thermoelectric element 131.

The cooling plate 135 may form one wall of the first water tank 121.

The heat sink 136 may be disposed on the second side of the thermoelectric element 131 and may receive heat from the thermoelectric element 131. The heat transferred from the thermoelectric element 131 to the heat sink 136 may be high temperature heat.

The heat sink 136 may generate heat by heat received from the thermoelectric element 131.

The heat sink 136 may heat the purified water stored in the first water tank 121 using heat transferred from the thermoelectric element 131.

The heat sink 136 may form a part of one wall of the second water tank 122. In this case, the water purifier 1 may generate cold water and hot water in a single water tank and provide the generated cold water and hot water to the user.

Figure 6:
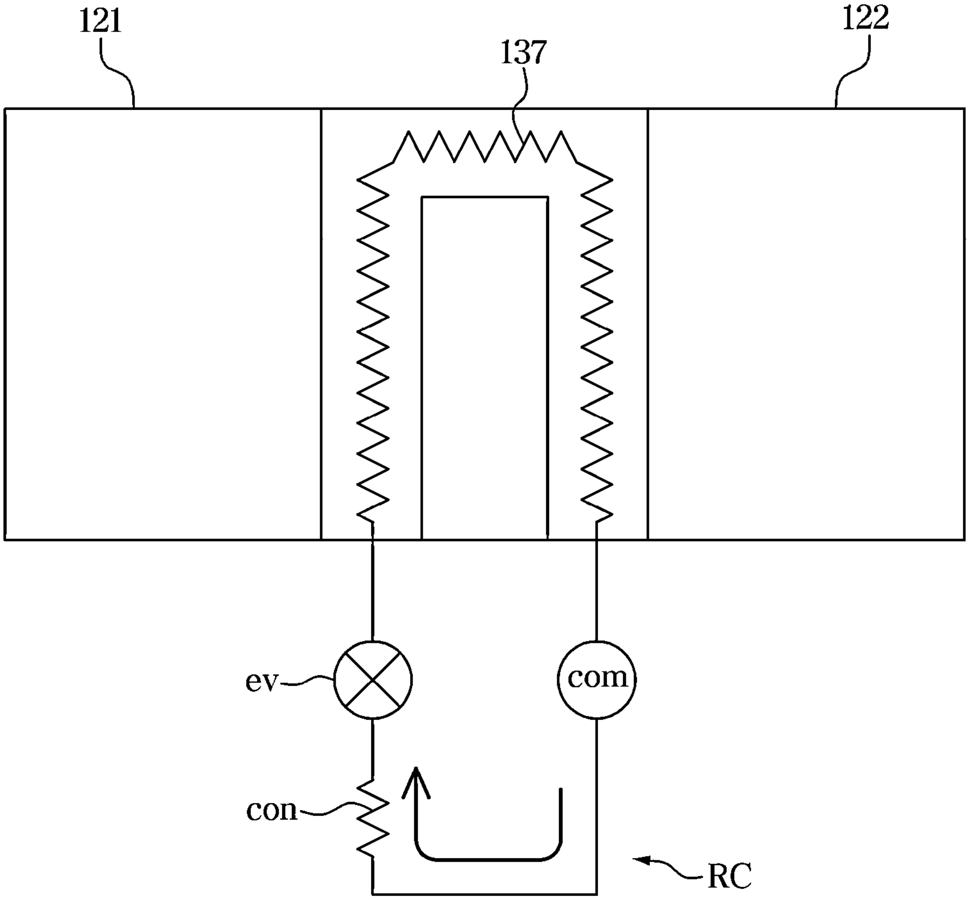

As shown in FIG. 6, the water temperature regulator 130 may include an evaporator 137 of a refrigeration cycle RC.

The refrigeration cycle RC may include a compressor (com), the evaporator 137 connected to the compressor (com), a condenser (con) connected to the compressor (com), and an expander (ev) connected to the condenser (con). The refrigeration cycle RC may further include a refrigerant pipe connecting the compressor (com), the condenser (con), the expander (ex), and the evaporator 137.

The compressor (com) compresses a refrigerant and discharges the compressed, high-temperature, high-pressure gaseous refrigerant to the condenser (con).

The condenser (con) is connected to a discharge port of the compressor (com) and condenses the refrigerant introduced from the compressor (com) through heat exchange. In this instance, the high-temperature, high-pressure gaseous refrigerant changes phase into a high-temperature, high-pressure liquid refrigerant.

The expander (ev) is positioned between the condenser (con) and the evaporator 137, lowers the pressure and temperature of the refrigerant flowing from the condenser (con) so as to facilitate heat absorption due to evaporation of the refrigerant, and then transfers to the evaporator 137. In other words, the refrigerant that has passed through the expander (ev) changes from the high-temperature, high-pressure liquid state to a low-temperature, low-pressure liquid state.

Here, the expander (ev) may be an expansion valve or may be a capillary tube.

The evaporator 137 changes phase from the low-temperature, low-pressure liquid refrigerant into low-temperature, low-pressure gaseous refrigerant through heat exchange, and transfers the low-temperature, low-pressure gaseous refrigerant to the compressor (com).

The evaporator 137 may absorb heat through heat exchange.

The evaporator 137 may be positioned between the first water tank 121 and the second water tank 122.

The evaporator 137 may be located in a cooling room positioned between the first water tank 121 and the second water tank 122.

By performing heat exchange with the purified water in the first water tank 121 and the purified water in the second water tank 122, the purified water in the first water tank 121 and the purified water in the second water tank 122 may be cooled.

The evaporator 137 may form one wall of the first water tank 121 and form one wall of the second water tank 122.

The evaporator forming the one wall of the first water tank 121 and the evaporator forming the one wall of the second water tank 122 may be the same evaporator.

The purified water in the first water tank 121 and the purified water in the second water tank 122 may be cooled to the same or similar temperature.

Figure 7:
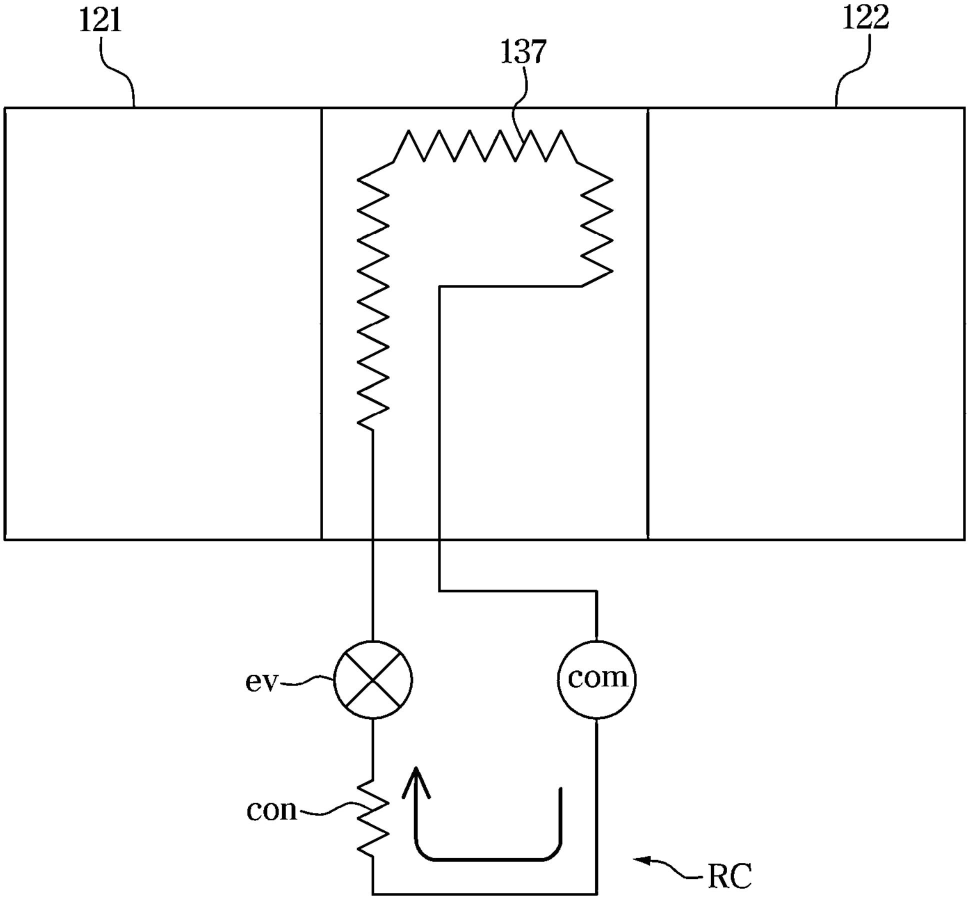

As shown in FIG. 7, the water temperature regulator 130 may include the evaporator 137 of refrigeration cycle RC.

The refrigeration cycle RC is the same as the refrigeration cycle RC shown in FIG. 6, and thus a description thereof is omitted herein.

The evaporator 137 may be positioned between the first water tank 121 and the second water tank 122.

The evaporator 137 may be located in a cooling room positioned between the first water tank 121 and the second water tank 122.

The evaporator 137 performs heat exchange with the purified water of the first water tank 121 and the purified water of the second water tank 122, thereby cooling the purified water of the first water tank 121 and the purified water of the second water tank 122.

The evaporator 137 may be formed on an entire one wall of the first water tank 121.

The evaporator 137 may be formed on a part of one wall of the second water tank 122.

A size of the evaporator positioned adjacent to the first water tank 121 may be larger than a size of the evaporator positioned adjacent to the second water tank.

The evaporator forming the entire one wall of the first water tank 121 and the evaporator forming a part of the one wall of the second water tank 122 may be the same evaporator.

A temperature of cold water in the second water tank 122 may be higher than a temperature of cold water in the first water tank 121. In this case, the water purifier 1 may provide a user with cold water of different temperatures. The user may select cold water of a desired temperature and be provided with the cold water of the user's selection.

FIG. 3, FIG. 4, FIG. 5, FIG. 6, and FIG. 7 illustrate a water purifier including water tank with a single water temperature regulator.

As a modified example, the water purifier may include first and second water temperature regulators provided in the first and second water tanks, respectively. In this case, a water temperature of the first water tank may be adjusted by the first water temperature regulator, and a water temperature of the second water tank may be adjusted by the second water temperature regulator.

The water temperatures of the first and second water tanks may be adjusted the same or differently.

The first water temperature regulator may be a first thermoelectric element, and the second water temperature regulator may be a second thermoelectric element.

The first water temperature regulator may be a first evaporator of refrigeration cycle, and the second water temperature regulator may be a second evaporator of refrigeration cycle.

For example, the refrigeration cycle may further include a first refrigerant control valve positioned on the first evaporator to adjust the refrigerant supplied to the first evaporator, and a second refrigerant control valve positioned on the second evaporator to adjust the refrigerant supplied to the second evaporator.

As another example, the refrigeration cycle may include a three-way valve positioned between an expansion valve and a point where an inlet of the first evaporator and an inlet of the second evaporator are connected so as to adjust the refrigerant supplied to the first and second evaporators.

As still another example, the refrigeration cycle may further include a first evaporator, a second evaporator, a first expansion valve connected to an inlet of the first evaporator, a second expansion valve connected to an inlet of the second evaporator, a first refrigerant control valve disposed between the first expansion valve and the condenser, and a second refrigerant control valve disposed between the second expansion valve and the condenser.

The flowmeter 140 may be positioned between the filter 110 and the water tank 120.

The flowmeter 140 may detect the amount of water supplied to the filter 110 and the water tank 120. The flowmeter 140 detects the amount of water flowing from the filter 110 to the water tank 120 per unit time.

The flowmeter 140 may include any one of a differential pressure flowmeter that detects flow rate using differential pressure, an area flowmeter, a volumetric flowmeter or mass flowmeter that detect volume or mass flowing in unit time, an electromagnetic flowmeter that uses the law of electromagnetic induction, an ultrasonic flowmeter that uses ultrasonic waves, a thermal flowmeter (heated anemometer), or a vane-type flowmeter, without being limited thereto.

The sterilizer 150 may be connected to an external water pipe or may be connected to the water tank.

The sterilizer 150 may generate sterilized water by electrolyzing raw water supplied from the external water pipe. The generated sterilized water may be used to sterilize and clean the first and second water tanks.

That is, the sterilizer 150 may generate sterilized water and supply the generated sterilized water to the first water tank 121 and the second water tank 122.

The sterilizer 150 may include a chamber for storing raw water, and first and second electrodes spaced apart from each other at regular intervals within the chamber. The first electrode and the second electrode may be positioned to be left and right symmetrically in the chamber.

In a case where the first electrode is an anode, the second electrode may be a cathode.

Titanium (Ti) may be coated with platinum (Pt) on the first and second electrodes. The first and the second electrodes may be arranged in a mesh-like shape to increase a surface area.

When voltage is applied to the first electrode 320 and the second electrode 330 of the sterilizer 150, raw water flowing into the chamber is electrolyzed. In this instance, chlorine ($Cl_2$), hydrogen chloride (HCl), hypochlorous acid (HOCl), oxygen ($O_2$), hydrogen ions (H+), and electrons (e−) may be generated at the first electrode which is the anode. Water may be generated at the second electrode which is the cathode.

Among the above elements, hypochlorous acid is one of the oxygen acids, and has sterilizing properties. The sterilized water containing hypochlorous acid may be supplied to the first and second water tanks.

The following reactions may occur in the first and second electrodes of the sterilizer.

First electrode (anode): $2Cl^- \rightarrow Cl_2 + 2e^-$ [Reaction Formula]

$$Cl_2 + H_2O \rightarrow HCl + HOCl$$

$$H_2O \rightarrow \tfrac{1}{2}O_2 + 2H^+ + 2e^-$$

Second electrode(cathode): $2H_2O + 2e^- \rightarrow H_2 + 2OH^-$ $$H^+ + OH^- \rightarrow H_2O$$

The water purifier 1 may further include a first temperature sensor 161, a second temperature sensor 162, a first water level sensor 163, and a second water level sensor 164 in the water tank.

The first temperature sensor 161 may be positioned in the first water tank 121 and detect a temperature of water stored in the first water tank 121. Hereinafter, the temperature of the water detected by the first temperature sensor 161 is described as a first water temperature.

The second temperature sensor 162 may be positioned in the second water tank 122 and detect a temperature of water stored in the second water tank 122. Hereinafter, the temperature of the water detected by the second temperature sensor 162 is described as a second water temperature.

For example, the first temperature sensor 161 and the second temperature sensor 162 may include any one of a thermocouple, a thermistor, or a Resistance Temperature Detector (RTD).

The first temperature sensor 161 and the second temperature sensor 162 may also include a liquid expansion temperature sensor that uses expansion of liquid, or a bimetal temperature sensor that uses a thermal expansion rate of a metal according to temperature. The first temperature sensor 161 and the second temperature sensor 162 may also include an infrared temperature sensor that detects temperature using infrared rays, or a radiation temperature sensor that detects temperature based on the amount of radiation emitted from a water surface, without being limited thereto.

The first water level sensor 163 may be positioned in the first water tank 121 and detect a level of water stored in the first water tank 121. Hereinafter, the water level detected by the first water level sensor 163 is described as a first water level.

The second water level sensor 164 may be positioned in the second water tank 122 and detect a level of water stored in the second water tank 122. Hereinafter, the water level detected by the second water level sensor 164 is described as a second water level.

The first water level sensor 163 and the second water level sensor 164 may include any one of a float switch, capacitance sensor, conductivity sensor, pressure conversion sensor, ultrasonic sensor, radar level sensor, or differential pressure sensor, without being limited thereto.

The water purifier 1 may include a plurality of passages (p1 to p12) and a plurality of valves (v1 to v7).

A first passage p1 may be positioned between an external water pipe and the filter 110, may be supplied with raw water from the external water pipe, and may transfer the supplied raw water to the filter 110.

The first passage p1 may be connected to the sterilizer 150 and transfer the raw water supplied from the external water pipe to the sterilizer 150.

A second passage p2 may be positioned between the filter 110 and the water tank 120.

The second passage p2 may transfer purified water filtered by the filter 110 to the water tank 120.

The flowmeter 140 may be positioned on the second passage p2. That is, the flowmeter 140 may detect the amount of purified water flowing through the second passage p2.

A third passage p3 may be connected to the first water tank 121, may be connected to the second passage p2, and may be connected to the sterilizer 150.

The third passage p3 may transfer the purified water filtered by the filter 110 to the first water tank 121.

The third passage p3 may transfer sterilized water generated in the sterilizer 150 to the first water tank 121.

The third passage p3 may be a first water inlet passage into which the purified water or sterilized water is input.

A fourth passage p4 may be connected to the second water tank 122, may be connected to the second passage p2, and may be connected to the sterilizer 150.

The fourth passage p4 may transfer the purified water filtered by the filter 110 to the second water tank 122.

The fourth passage p4 may transfer the sterilized water generated in the sterilizer 150 to the second water tank 122.

The fourth passage p4 may be a second water inlet passage into which the purified water or sterilized water is input.

A fifth passage p5 may be connected to the first water tank 121, and may be connected to a seventh passage p7 and an eighth passage p8.

The fifth passage p5 is a passage through which purified water of the first water tank 121 is output. The fifth passage p5 may be a first water outlet passage through which the purified water of the first water tank 121 is output.

The purified water output from the fifth passage p5 may flow to the seventh passage p7 or the eighth passage p8.

A sixth passage p6 may be connected to the second water tank 122, and may be connected to the seventh passage p7 and the eighth passage p8.

The sixth passage p6 is a passage through which purified water of the second water tank 122 is output. The sixth passage p6 may be a second water outlet passage through which the purified water of the second water tank 122 is output.

The purified water output from the sixth passage p6 may flow to the seventh passage p7 or the eighth passage p8.

The seventh passage p7 may be connected to the fifth passage p5 and the sixth passage p6.

The seventh passage p7 may be a passage through which the purified water of the first water tank 121 transferred through the fifth passage p5 flows, or through which the purified water of the second water tank 122 transferred through the sixth passage p6 flows.

The seventh passage p7 is a water supply passage that supplies the purified water of the first water tank 121 or the purified water of the second water tank 122 to the user.

The eighth passage p8 may be connected to the fifth passage p5 and the sixth passage p6.

The eighth passage p8 may be a passage through which the purified water of the first water tank 121 transferred through the fifth passage p5 flows, or through which the purified water of the second water tank 122 transferred through the sixth passage p6 flows.

The eighth passage p8 may be a passage through which the sterilized water of the first water tank 121 transferred through the fifth passage p5 flows, or through which the sterilized water of the second water tank 122 transferred through the sixth passage p6 flows.

The eighth passage p8 may allow the sterilized water of the first water tank 121 or the sterilized water of the second water tank 122 to be discharged to the outside.

A ninth passage p9 may be connected to the first passage p1 or may be connected to the external water pipe.

The ninth passage p9 may be connected to the sterilizer 150 and supply raw water to the sterilizer.

A tenth passage p10 may be connected to the sterilizer 150 and the water tank 120.

The tenth passage p10 may be a passage that is supplied with the sterilized water from the sterilizer 150 and transfers the supplied sterilized water to the water tank 120.

An eleventh passage p11 may be connected to the third passage p3 connected to the first water tank and the fourth passage p4 connected to the second water tank.

The eleventh passage p11 may be an integrated passage in which the third passage p3 connected to the first water tank and the fourth passage p4 connected to the second water tank are integrated.

The eleventh passage p11 may be connected to the second passage p2 and may transfer filtered purified water to the third passage p3 or the fourth passage p4.

The eleventh passage p11 may be connected to the tenth passage p10 and may transfer sterilized water to the third passage p3 or the fourth passage p4.

A twelfth passage p12 may be connected to the fifth passage p5 connected to the first water tank and the sixth passage p6 connected to the second water tank.

The twelfth passage p12 may be a connection passage connecting the fifth passage p5 connected to the first water tank and the sixth passage p6 connected to the second water tank.

The twelfth passage p12 may be connected to the seventh passage p7, and may be supplied with purified water of the first water tank or purified water of the second water tank from the fifth passage p5 or the sixth passage p6, and may transfer the purified water to the seventh passage p7.

The twelfth passage p12 may be connected to the eighth passage p8, and may be supplied with purified water of the first water tank or purified water of the second water tank from the fifth passage p5 or the sixth passage p6, and may transfer the purified water to the eighth passage p8.

The twelfth passage p12 may be supplied with sterilized water of the first water tank or sterilized water of the second water tank from the fifth passage p5 or the sixth passage p6, and may transfer the sterilized water to the eighth passage p8.

The twelfth passage p12 may be a drain pipe that discharges purified water or sterilized water to the outside.

A first valve v1 may be positioned on the second passage p2 and may open or close the second passage p2.

The first valve v1 may be opened to allow purified water to flow from the filter 110 to the water tank 120, and may be closed to block the flow of purified water from the filter 110 to the water tank 120.

The first valve v1 may be opened to allow purified water to flow from the filter 110 to the first water tank 121 or the second water tank 122 of the water tank 120.

The first valve v1 may be a water inlet valve that allows purified water to be supplied to the first water tank 121 or the second water tank 122 of the water tank 120.

A second valve v2 may be positioned on the fifth passage p5 and may open or close the fifth passage p5.

The second valve v2 may be opened to allow purified water to be output from the first water tank 121, and may be closed to block the purified water from being output from the first water tank 121.

The second valve v2 may be a first water outlet valve that allows purified water to be output from the first water tank 121.

A third valve v3 may be positioned on the sixth passage p6 and may open or close the sixth passage p6.

The third valve v3 may be opened to allow purified water to be output from the second water tank 122, and may be closed to block the purified water from being output from the second water tank 122.

The third valve v3 may be a second water outlet valve that allows purified water to be output from the second water tank 122.

A fourth valve v4 may be positioned on the seventh passage p7 and may open or close the seventh passage p7.

The fourth valve v4 may be opened to allow purified water of the first water tank 121 or the second water tank 122 to be supplied, and may be closed to block the supply of the purified water of the first water tank 121 or the second water tank 122.

The fourth valve v4 may be a water supply valve that allows purified water to be supplied to the user or blocks the supply of purified water.

A fifth valve v5 may be positioned on the eighth passage p8 and may open or close the eighth passage p8.

The fifth valve v5 may be opened to discharge purified water of the first water tank 121 or the second water tank 122 to the outside, and may be closed to block the purified water of the first water tank 121 or the second water tank 122 from being discharged to the outside.

The fifth valve v5 may be opened to discharge sterilized water of the first water tank 121 or the second water tank 122 to the outside, and may be closed to block the sterilized water of the first water tank 121 or the second water tank 122 from being discharged to the outside.

The fifth valve v5 may be a drain valve that allows purified water and sterilized water of the first water tank 121 or the second water tank 122 to be discharged to the outside.

A sixth valve v6 may be positioned on the ninth passage p9 and may open or close the ninth passage p9.

The sixth valve v6 may be opened to allow raw water to be supplied to the sterilizer 150, and may be closed to block the supply of raw water to the sterilizer 150.

The sixth valve v6 may be a raw water valve that supplies raw water or blocks the supply of raw water.

A seventh valve v7 may be positioned on the tenth passage p10 and may open or close the tenth passage p10.

The seventh valve v7 may be opened to allow sterilized water to be supplied to the first water tank 121 or the second water tank 122 of the water tank 120, and may be closed to block the supply of sterilized water to the water tank 120.

The seventh valve v7 may be a sterilization valve that supplies sterilized water or blocks the supply of sterilized water.

At least one component may be added or omitted corresponding to the performance of the components of the water purifier 1 shown in FIG. 1. In addition, it will be easily understood by those skilled in the art that the mutual positions of the components may be modified corresponding to the performance or structure of the water purifier 1.

Figure 8:
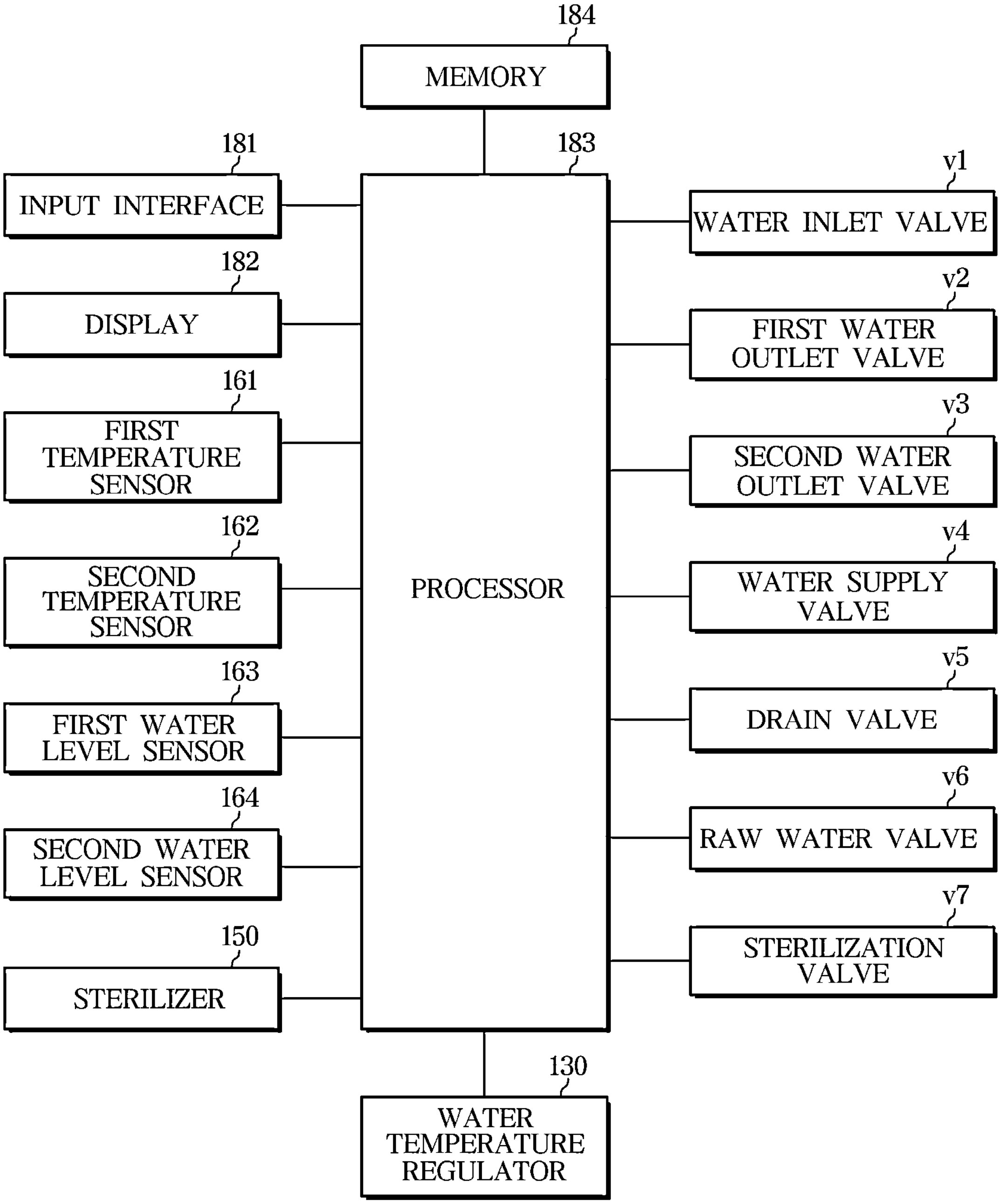
FIG. 8 is a control block diagram illustrating a water purifier according to an embodiment.

FIG. 8 is a control block diagram illustrating a water purifier according to an embodiment.

The water purifier may include the plurality of valves v1 to v7, the water temperature regulator 130, the sterilizer 150, the first temperature sensor 161, the second temperature sensor 162, the first water level sensor 163, and the second water level sensor 164, the input interface 181, the display 182, a processor 183, and memory 184.

The plurality of valves v1 to v7 may be opened or closed in response to control commands from the processor 183.

The plurality of valves v1 to v7 may include the water inlet valve v1, the first water outlet valve v2, the second water outlet valve v3, the water supply valve v4, the drain valve v5, the raw water valve v6, and the sterilization valve v7.

Because the plurality of valves v1 to v7 have been described with reference to FIG. 1, descriptions thereof are omitted herein.

The water temperature regulator 130 may cool or heat the water stored in the first water tank 121 and the second water tank 122 of the water tank 120. The water stored in the first water tank 121 and the second water tank 122 may be purified water.

The water temperature regulator 130 may be turned on or off in response to a control command from the processor 183.

In a case where the water tank is a cold water tank, the water temperature regulator 130 may cool the water stored in the first water tank 121 and the second water tank 122 in response to a control command of the processor 183.

The sterilizer 150 may operate or stop in response to a control command from the processor 183. While operating in response to the control command from the processor 183, the sterilizer 150 may perform electrolysis to generate sterilized water.

The first temperature sensor 161 may detect a temperature of the water stored in the first water tank 121 and transmit first water temperature information corresponding to the detected water temperature to the processor 183.

The second temperature sensor 162 may detect a temperature of the water stored in the second water tank 122 and transmit second water temperature information corresponding to the detected water temperature to the processor 183.

The first water level sensor 163 may detect a level of the water stored in the first water tank 121 and transmit first water level information corresponding to the detected water level to the processor 183.

The second water level sensor 164 may detect a level of the water stored in the second water tank 122 and transmit second water level information corresponding to the detected water level to the processor 183.

The input interface 181 may receive user input and transmit the received user input to the processor 183.

The input interface 181 may receive a power-on command, a power-off command, a water outlet command, and a water quantity selection command. The water outlet command may include a purified water outlet command, a hot water outlet command, and a cold water outlet command.

The input interface 181 may also receive a cleaning command.

The display 182 may display operation information of the water purifier in response to a control command from the processor 183.

The display 182 may display power on/off information, information about the type of water to be output (discharged), and information about the amount of water to be output (discharged). The information about the type of water to be output may include at least one of purified water, hot water, or cold water.

The display 182 may display temperature information of water stored in each water tank, and may display information about a height (i.e., water level) of water stored in each water tank.

The display 182 may also display a current operating mode of the water purifier. That is, the display 182 may display a cleaning mode corresponding to cleaning of one of the first water tank 121 and the second water tank 122, or a water outlet mode corresponding to water discharge from one of the first water tank 121 and the second water tank 122.

The display 182 may be provided as a Digital Light Processing (DLP) panel, Plasma Display Panel, Liquid Crystal Display (LCD) panel, Electro Luminescence (EL) panel, Electrophoretic Display (EPD) panel, Electrochromic Display (ECD) panel, Light Emitting Diode (LED) panel, or Organic Light Emitting Diode (OLED) panel, without being limited thereto.

The processor 183 performs overall control related to operations of the water purifier 1.

The processor 183 may determine whether a current time is a cleaning time for the first water tank 121, and control the first water tank 121 to be cleaned based on the current time being determined as the cleaning time for the first water tank 121. The processor 183 may count the time since the cleaning of the first water tank 121 was completed based on determining that the cleaning of the first water tank 121 is complete, may determine whether a current time is a cleaning time for the second water tank 122 based on the counted time, and may control the second water tank 122 to be cleaned based on the current time being determined as the cleaning time for the second water tank.

Based on determining that the counted time has elapsed a reference time, the processor 183 may determine that a current time is the cleaning time for the second water tank 122. Here, the reference time may be a time corresponding to an interval between cleaning of the first water tank and cleaning of the second water tank.

The processor 183 may count the time since the cleaning of the second water tank 122 was completed, based on determining that the cleaning of the second water tank 122 is complete, and may determine a cleaning time for the first water tank 121 based on the counted time.

In controlling the cleaning of one of the first and second water tanks, the processor 183 may control the water outlet valve connected to the one water tank and the drain valve to be opened, so as to allow the water stored in the one water tank to be discharged, and once the discharge of water stored in the one water tank is complete, the processor 183 may control the water outlet valve connected to the one water tank and the drain valve to be closed.

In controlling the cleaning of one of the first and second water tanks, the processor 183 may control the sterilizer 150 to generate sterilized water in the chamber of the sterilizer 150.

The processor 183 may control the raw water valve v6 to be opened so as to allow raw water to be supplied to the sterilizer 150, and may control the raw water valve v6 to be closed based on determining that the supply of raw water to the sterilizer 150 is complete.

The processor 183 may apply a preset current to the first and second electrodes in the chamber of the sterilizer 150 to allow raw water to be electrolyzed in the chamber. In this instance, once the raw water is electrolyzed, sterilized water containing hypochlorous acid (HOCl) may be generated.

The processor 183 may control the sterilization valve v7 to be opened to allow the sterilized water generated in the sterilizer 150 to be supplied to any one chamber. In this case, the processor 183 may control the water inlet valve v1 to be closed so as to prevent water of the filter 110 from being supplied to the any one chamber.

Once the supply of sterilized water is complete, the processor 183 may control the sterilization valve v7 to be closed, and may count the time since the supply of sterilized water. Once the counted time reaches a preset cleaning time, the processor 183 may control a water outlet valve connected to any one water tank and the drain valve to be opened so as to allow the sterilized water stored in the one water tank to be discharged, and once the discharge of the sterilized water stored in the one water tank is complete, the processor 183 may control the water outlet valve connected to the one water tank and the drain valve to be closed.

The processor 183 may control the water inlet valve v1 to be opened to allow water to be supplied to any one water tank based on completion of the cleaning of the one water tank, and based on determining that the supply of water of the filter 110 to the one water tanks is complete, the processor 183 may control the water inlet valve v1 to be closed.

The processor 183 may determine whether one of the first water tank 121 and the second water tank 122 is being cleaned based on receiving a water outlet command from the input interface 181, and based on determining that one water tank of the two water tanks is being cleaned, may control the water outlet valve connected to another water tank and the water supply valve to be opened so as to allow water to be output from the other water tank.

For example, based on determining that the first water tank 121 is being cleaned, the processor 183 may control the second water outlet valve v3 and the water supply valve v4 to be opened so as to allow water to be output from the second water tank 12, and based on determining that the second water tank 122 is being cleaned, the processor 183 may control the first water outlet valve v2 and the water supply valve v4 to be opened so as to allow water to be output from the first water tank 121.

In a case where the water tank is a cold water tank, based on receiving a water outlet command from the input interface 181 and determining that neither the first water tank 121 nor the second water tank 122 is being cleaned, the processor 183 may confirm a first water temperature of the first water tank detected by the first temperature sensor 161 and a second water temperature of the second water tank detected by the second temperature sensor 162, and may compare the first water temperature and the second water temperature to identify a lower water temperature among the first and second water temperatures. The processor 183 may identify a water tank corresponding to the identified lower water temperature, and control the water outlet valve connected to the identified water tank and the water supply valve to be opened so as to allow water to be output from the identified water tank.

In a case where the water tank is a cold water tank, based on determining that the first water temperature is lower than the second water temperature, the processor 183 may control the first water outlet valve v2 and the water supply valve v4 to be opened so as to allow water to be output from the first water tank 121. Based on determining that the second water temperature is lower than the first water temperature, the processor 183 may control the second water outlet valve v3 and the water supply valve v4 to be opened so as to allow water to be output from the second water tank 122.

In a case where the water tank is a hot water tank, based on receiving a water outlet command from the input interface 181 and determining that neither the first water tank 121 nor the second water tank 122 is being cleaned, the processor 183 may confirm a first water temperature of the first water tank detected by the first temperature sensor 161 and a second water temperature of the second water tank detected by the second temperature sensor 162, and may identify a higher water temperature among the first and second water temperatures. The processor 183 may identify a water tank corresponding to the identified higher water temperature, and control a water outlet valve connected to the identified water tank and the water supply valve to be opened so as to allow water to be output from the identified water tank.

In a case where the water tank is a hot water tank, based on determining that the first water temperature is higher than the second water temperature, the processor 183 may control the first water outlet valve v2 and the water supply valve v4 to be opened so as to allow water to be output from the first water tank 121. Based on determining that the second water temperature is higher than the first water temperature, the processor 183 may control the second water outlet valve v3 and the water supply valve v4 to be opened so as to allow water to be output from the second water tank 122.

Based on receiving the water outlet command from the input interface 181 and determining that neither the first water tank 121 nor the second water tank 122 is being cleaned, the processor 183 may confirm a first water level of the first water tank detected by the first water level sensor 163 and a second water level of the second water tank detected by the second water level sensor 164, and compare the first water level and the second water level to identify a higher water level among the first and second water levels. The processor 183 may identify a water tank corresponding to the identified higher water level, and may control the water outlet valve connected to the identified water tank and the water supply valve to be opened so as to allow water to be output from the identified water tank.

For example, based on determining that the first water level is higher than the second water level, the processor 183 may control the first water outlet valve v2 and the water supply valve v4 to be opened so as to allow water to be output from the first water tank 121. Based on determining that the second water level is higher than the first water level, the processor 183 may control the second water outlet valve v3 and the water supply valve v4 to be opened so as to allow water to be output from the second water tank 122.

Based on receiving the water outlet command from the input interface 181 and determining that neither the first water tank 121 nor the second water tank 122 is being cleaned, the processor 183 may confirm a first water level of the first water tank detected by the first water level sensor 163 and a second water level of the second water tank detected by the second water level sensor 164, compare the first water level and a reference water level, and compare the second water level and the reference water level.

Based on determining that the first water level is less than the reference water level and the second water level is greater than or equal to the reference water level, the processor 183 may control the second water outlet valve and the water supply valve to be opened so as to allow water to be output from the second water tank 122. Based on determining that the second water level is less than the reference water level and the first water level is greater than or equal to the reference water level, the processor 183 may control the first water outlet valve v2 and the water supply valve v4 to be opened so as to allow water to be output from the first water tank 121.

In a case where the water tank is a cold water tank, based on determining that the first water level is greater than or equal to the reference water level and the second water level is greater than or equal to the reference water level, the processor 183 may confirm a first water temperature of the first water tank 121 and a second water temperature of the second water tank 122, compare the first and second water temperatures to identify a lower water temperature among the first and second water temperatures, identify a water tank corresponding to the identified lower water temperature, and control the water outlet valve connected to the identified water tank and the water supply valve to be opened so as to allow water to be output from the identified water tank.

In a case where the water tank is a hot water tank, based on determining that the first water level is greater than or equal to the reference water level and the second water level is greater than or equal to the reference water level, the processor 183 may confirm a first water temperature of the first water tank 121 and a second water temperature of the second water tank 122, compare the first and second water temperatures to identify a higher water temperature among the first and second water temperatures, identify a water tank corresponding to the identified higher water temperature, and control the water outlet valve connected to the identified water tank and the water supply valve to be opened so as to allow water to be output from the identified water tank.

Based on determining that the water supply is complete, the processor 183 may control the open water outlet valve and water supply valve v4 to be closed, and may control the water inlet valve v1 to be opened so as to allow the water of the filter 110 to be supplied to the water tank from which water has been output. Once the water supply to the water tank is complete, the processor 183 may control the water inlet valve v1 to be closed, and control an operation of the water temperature regulator 130. The processor 183 may confirm a water temperature detected by the temperature sensor positioned in the water tank to which the water has been supplied, and based on determining that the confirmed water temperature reaches a target temperature, the processor 183 may control the water temperature regulator 130 to be stopped.

For example, after outputting the water from the first water tank 121, based on determining that the water supply to the first water tank 121 is complete, the processor 183 may control the first water outlet valve v2 and the water supply valve v4 to be closed, and may control the water inlet valve v1 to be opened so as to allow the water of the filter 110 to be supplied to the first water tank 121. Based on a flow rate detected by the flowmeter 140, the processor 183 may determine whether water is supplied to the first water tank 121, and based on determining that the water supply to the first water tank 121 is complete, the processor 183 may control the water inlet valve v1 to be closed, may control an operation of the water temperature regulator 130, and may confirm a first water temperature detected by the first temperature sensor 161. Based on determining that the confirmed first water temperature reaches a preset temperature, the processor 183 may control the water temperature regulator 130 to be stopped. The preset temperature may be the target temperature of water in the first water tank 121.

The processor 183 may control cleaning of any one of the first water tank and second water tank based on receiving a cleaning mode selection command from the input interface 181.

Based on receiving a cleaning mode selection command and a water tank selection command from the input interface 181, the processor 183 may control cleaning of the selected water tank.

The processor 183 may also control simultaneous cleaning of the first and second water tanks based on receiving a cleaning mode selection command and a simultaneous cleaning command from the input interface 181. In this case, the processor 183 may control the display 182 to output a water outlet stop message during a cleaning time of the first and second water tanks.

The processor 183 may perform the above-described operations using data stored in the memory 184.

The memory 184 may store information about a reference time corresponding to a cleaning cycle between the first and second water tanks, a cleaning time required for cleaning the first and second water tanks, a preset temperature for adjusting the water temperature of the first and second water tanks, and the reference water level of the first and second water tanks.

In a case where the water tank is a hot water tank, the preset temperature may be the first target temperature.

In a case where the water tank is a cold water tank, the preset temperature may be the second target temperature. Here, the second target temperature may be lower than the first target temperature.

The memory 184 may store data about an algorithm for controlling operations of components of the water purifier or a program that reproduces the algorithm.

The memory 184 and the processor 183 may be implemented as separate chips. Alternatively, the memory 184 and the processor 183 may be implemented as a single chip.

The memory 184 may be implemented as at least one of volatile memory such as a Random Access Memory (RAM), non-volatile memory such as a Read Only Memory (ROM), Programmable Read Only Memory (PROM), Erasable Programmable Read Only Memory (EPROM), and Electrically Erasable Programmable Read Only Memory (EEPROM), or storage medium such as Hard Disk Drive (HDD) and Compact Disc Read Only Memory (CD-ROM), without being limited thereto.

At least one component may be added or omitted corresponding to the performance of the components of the water purifier 1 shown in FIG. 8. In addition, it will be easily understood by those skilled in the art that the mutual positions of the components may be modified corresponding to the performance or structure of the water purifier 1.

Meanwhile, each component shown in FIG. 8 may refer to software and/or hardware components such as Field Programmable Gate Array (FPGA) and Application Specific Integrated Circuit (ASIC).

Figure 9:
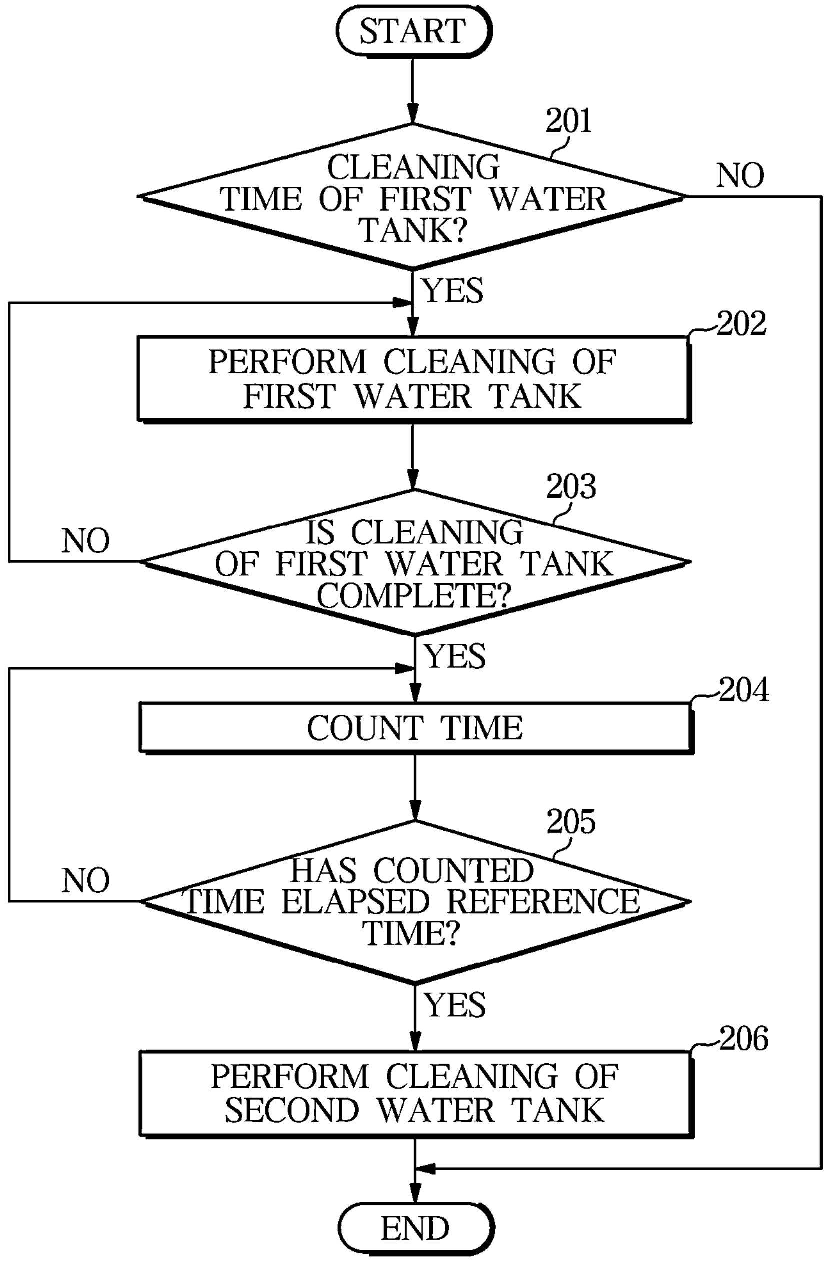
FIG. 9 is a flowchart illustrating determination operations for cleaning in a water purifier according to an embodiment.

FIG. 9 is a flowchart illustrating determination operations for cleaning in a water purifier according to an embodiment.

The water purifier 1 may determine whether a current time is a cleaning time for the first water tank 121 (201), and perform cleaning of the first water tank 121 based on determining that the current time is the cleaning time for the first water tank 121 (202).

Cleaning the first water tank 121 may include opening the first water outlet valve and the drain valve to discharge water stored in the first water tank, and based on completion of the discharge of the water stored in the first water tank, closing the first water outlet valve and the drain valve. As such, the water purifier may allow sterilized water to be supplied to the first water tank by discharging the water stored in the first water tank.

In determining whether the discharge of the water stored in the first water tank is complete, a first water level detected by the first water level sensor of the first water tank may be confirmed, and whether the discharge of the water stored in the first water tank is complete may be determined based on the confirmed first water level.

Determining whether the discharge of the water stored in the first water tank is complete may include determining whether the discharge of the water stored in the first water tank is complete by determining whether an opening time of the first water outlet valve (a period of time during which the first water outlet valve is open) has reached a preset drain time.

Determining whether the discharge of the water stored in the first water tank is complete may include determining whether the discharge of the water stored in the first water tank is complete by determining whether an opening time of the drain valve (a period of time during which the drain valve is open) has reached the preset drain time.

Cleaning the first water tank 121 may include allowing raw water to be supplied to the sterilizer 150 by opening the raw water valve v6 based on determining that the discharge of the water stored in the first water tank is complete, closing the raw water valve v6 based on determining that the supply of the raw water is complete, and generating sterilized water by applying electricity to first and second electrodes of the sterilizer to cause electrolysis in the sterilizer 150.

Cleaning the first water tank 121 may include opening the sterilization valve v7 to allow the sterilized water generated in the sterilizer to be supplied to the first water tank 121. In this instance, the first water tank 121 is an empty water tank, and thus the sterilized water that has passed through the open sterilization valve v7 flows into the first water tank 121 by pressure due to a pressure difference.

Cleaning the first water tank 121 may include, once the sterilized water flows into the first water tank 121, storing the introduced sterilized water in the first water tank 121 for a preset cleaning time, opening the first water outlet valve v2 and the drain valve v5 to allow the sterilized water stored in the first water tank 121 to be discharged to the outside when the time for which the sterilized water is stored elapses the preset cleaning time, and closing the first water outlet valve v2 and the drain valve v5 based on completion of the discharge of the sterilized water stored in the first water tank 121.

The water purifier may determine that the cleaning of the first water tank 121 is complete (203), based on completion of the discharge of the sterilized water from the first water tank.

The water purifier may determine whether the discharge of the sterilized water from the first water tank is complete based on the opening time of the first water outlet valve or the opening time of the drain valve, and may determine whether the discharge of the sterilized water from the first water tank is complete based on the first water level detected by the first water level sensor.

Based on determining that the cleaning of the first water tank 121 is complete, the water purifier may count the time since the cleaning of the first water tank 121 was completed (204), may determine whether the counted time has elapsed a reference time (205), and based on determining that the counted time has elapsed the reference time, may determine that a current time is a determined cleaning time for the second water tank 122.

The water purifier may perform cleaning of the second water tank 122 (206), in response to determining that the current time is for cleaning the second water tank 122.

Cleaning the second water tank 122 may include opening the second water outlet valve and the drain valve to discharge water stored in the second water tank, and based on completion of the discharge of the water stored in the second water tank, closing the second water outlet valve and the drain valve. As such, the water purifier may allow sterilized water to be supplied to the second water tank by discharging the water stored in the second water tank.

In determining whether the discharge of the water stored in the second water tank is complete, a second water level detected by the second water level sensor of the second water tank may be confirmed, and whether the discharge of the water stored in the second water tank is complete may be determined based on the confirmed second water level.

Determining whether the discharge of the water stored in the second water tank is complete may include determining whether the discharge of the water stored in the second water tank is complete by determining whether an opening time of the second water outlet valve (a period of time during which the second water outlet valve is open) has reached a preset drain time.

Determining whether the discharge of the water stored in the second water tank is complete may include determining whether the discharge of the water stored in the second water tank is complete by determining whether an opening time of the drain valve (a period of time during which the drain valve is open) has reached the preset drain time.

Cleaning the second water tank 122 may include allowing raw water to be supplied to the sterilizer 150 by opening the raw water valve v6 based on determining that the discharge of the water stored in the second water tank is complete, closing the raw water valve v6 based on determining that the supply of the raw water is complete, and generating sterilized water by applying electricity to first and second electrodes of the sterilizer to cause electrolysis in the sterilizer 150.

Cleaning the second water tank 122 may include opening the sterilization valve v7 to allow the sterilized water generated in the sterilizer to be supplied to the second water tank 122. In this instance, the second water tank is an empty water tank, and thus the sterilized water that has passed through the open sterilization valve v7 flows into the second water tank by pressure.

Cleaning the second water tank 122 may include, once the sterilized water flows into the second water tank, storing the introduced sterilized water in the second water tank for a preset cleaning time, opening the second water outlet valve v3 and the drain valve v5 to allow the sterilized water stored in the second water tank to be discharged to the outside when the time for which the sterilized water is stored elapses the preset cleaning time, and closing the second water outlet valve v3 and the drain valve v5 based on completion of the discharge of the sterilized water stored in the second water tank 122.

Figure 10:
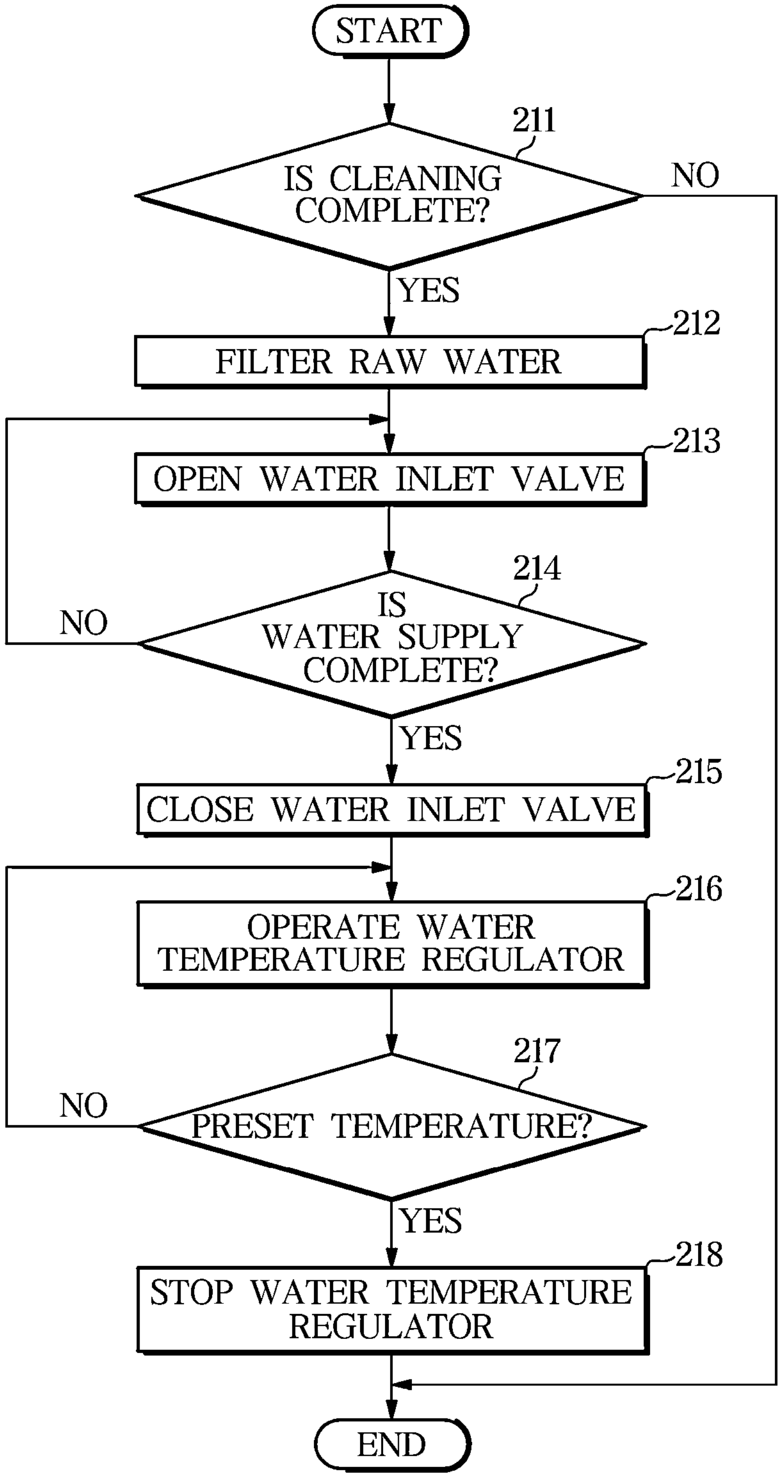
FIG. 10 is a flowchart illustrating operations of controlling water supply after cleaning in a water purifier according to an embodiment.

FIG. 10 is a flowchart illustrating operations of controlling water supply after cleaning in a water purifier according to an embodiment.

The water purifier may determine whether cleaning of any one water tank is complete (211).

Based on determining that the cleaning of one of the water tanks is complete, the water purifier may supply raw water to the filter 110 to filter the raw water (212), and open the water inlet valve v1 (213) to allow the water filtered by the filter 110 to be supplied to the any one water tank. In this instance, the cleaned water tank is an empty water tank, and thus water that has passed through the water inlet valve v1 may flow into the empty water tank by pressure.

The water purifier may close the water inlet valve v1 (215), based on determining that the supply of the filtered water is complete (214).

Determining that the supply of the filtered water is complete may include determining that a flow rate detected by the flowmeter 140 is a preset flow rate.

Determining that the supply of the filtered water is complete may include determining that an opening time of the water inlet valve v1 (a period of time during which the water inlet valve v1 is open) has reached a certain time. Here, the certain time corresponds to the amount of water to be supplied to the water tank and may be a preset time.

The water purifier may operate the water temperature regulator to change a temperature of water stored in the water tank (216), based on determining that the supply of the filtered water is complete.

In a case where the water tank is a cold water tank, the water purifier may cool the water stored in the water tank by operating the water temperature regulator.

In a case where the water tank is a hot water tank, the water purifier may heat the water stored in the water tank by operating the water temperature regulator 130.

The water purifier may detect the temperature of water detected by a temperature sensor positioned in the water tank, may determine whether the detected water temperature is a preset temperature (217), and may stop the operation of the water temperature regulator 130 (218) based on determining that the detected water temperature is the preset temperature.

For example, the water purifier may open the water inlet valve v1 to allow the filtered water to be supplied to the first water tank 121 based on completion of cleaning of the first water tank 121, and may close the water inlet valve v1 based on determining that the supply of the filtered water to the first water tank 121 is complete. Thereafter, the water purifier may adjust a temperature of the water stored in the first water tank 121 by operating the water temperature regulator 130. Thereafter, the water purifier may determine whether the temperature of the water in the first water tank 121 has reached a preset temperature based on a temperature detected by the first temperature sensor, and may stop the operation of the water temperature regulator 130 based on determining that the temperature of the water in the first water tank 121 has reached the preset temperature.

The water purifier may open the water inlet valve v1 to allow the filtered water to be supplied to the second water tank 122 based on completion of cleaning of the second water tank 122, and may close the water inlet valve v1 based on determining that the supply of the filtered water to the second water tank 122 is complete. Thereafter, the water purifier may adjust a temperature of the water stored in the second water tank 122 by operating the water temperature regulator 130. Thereafter, the water purifier may determine whether the temperature of the water in the second water tank 122 has reached a preset temperature based on a temperature detected by the second temperature sensor, and may stop the operation of the water temperature regulator 130 based on determining that the temperature of the water in the second water tank 122 has reached the preset temperature.

Figure 11:
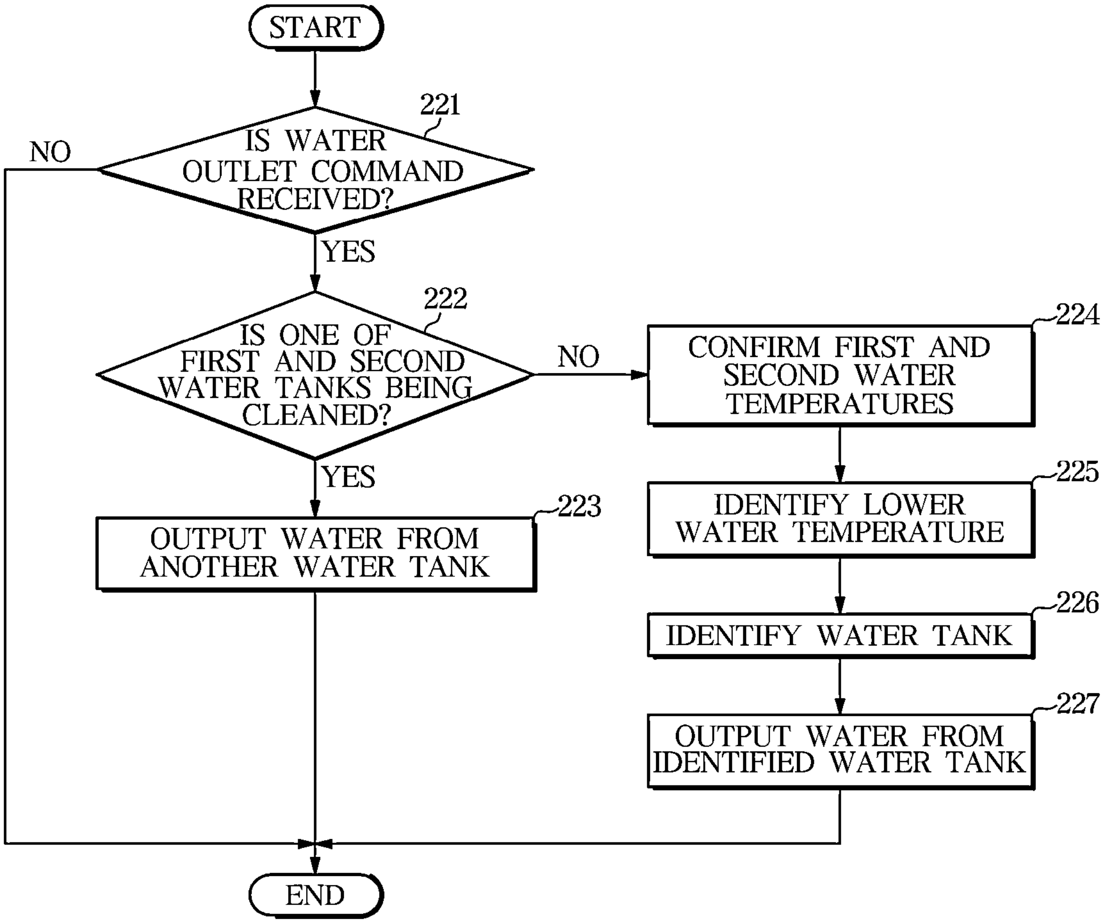
FIG. 11 is a flowchart illustrating operations of controlling water discharge in a water purifier according to an embodiment.

FIG. 11 is a flowchart illustrating operations of controlling water discharge in a water purifier according to an embodiment.

Water discharge control in a water purifier whose water tank is a cold water tank is described.

The water purifier may determine whether one of the first water tank 121 and the second water tank 122 is being cleaned (222) based on receiving a water outlet command from the input interface 181 (221). Based on determining that one water tank is being cleaned, the water purifier may output water from another water tank (223).

Outputting water from the other water tank may include controlling a water outlet valve connected to the other water tank and the water supply valve to be opened.

For example, based on determining that the first water tank 121 is being cleaned, the water purifier may control the second water outlet valve v3 and the water supply valve v4 to be opened so as to allow water to be output from the second water tank 122. Based on determining that the second water tank 122 is being cleaned, the water purifier may control the first water outlet valve v2 and the water supply valve v4 to be opened so as to allow water to be output from the first water tank 121.

Upon receiving a water outlet command from the input interface 181, based on determining that neither the first water tank 121 nor the second water tank 122 is being cleaned, the water purifier may confirm a first water temperature of the first water tank detected by the first temperature sensor 161 and a second water temperature of the second water tank detected by the second temperature sensor 162 (224), and may compare the first water temperature and the second water temperature to identify a lower water temperature among the first and second water temperatures (225). The water purifier may identify a water tank corresponding to the identified lower water temperature (226), and output water from the identified water tank (227).

Here, outputting water from the identified water tank may include controlling a water outlet valve connected to the identified water tank and the water supply valve to be opened.

For example, based on determining that the first water temperature is lower than the second water temperature, the water purifier may control the first water outlet valve v2 and the water supply valve v4 to be opened so as to allow water to be output from the first water tank 121. Based on determining that the second water temperature is lower than the first water temperature, the water purifier may control the second water outlet valve v3 and the water supply valve v4 to be opened so as to allow water to be output from the second water tank 122.

Upon receiving a water outlet command from the input interface 181, based on determining that neither the first water tank 121 nor the second water tank 122 is being cleaned, the water purifier may confirm a first water level of the first water tank detected by the first water level sensor 163 and a second water level of the second water tank detected by the second water level sensor 164, and compare the first water level and the second water level to identify a higher water level among the first and second water levels. The water purifier may identify a water tank corresponding to the identified higher water level, and may control a water outlet valve connected to the identified water tank and the water supply valve to be opened so as to allow water to be output from the identified water tank.

For example, based on determining that the first water level is higher than the second water level, the water purifier may control the first water outlet valve v2 and the water supply valve v4 to be opened so as to allow water to be output from the first water tank 121. Based on determining that the second water level is higher than the first water level, the water purifier may control the second water outlet valve v3 and the water supply valve v4 to be opened so as to allow water to be output from the second water tank 122.

Figure 12:
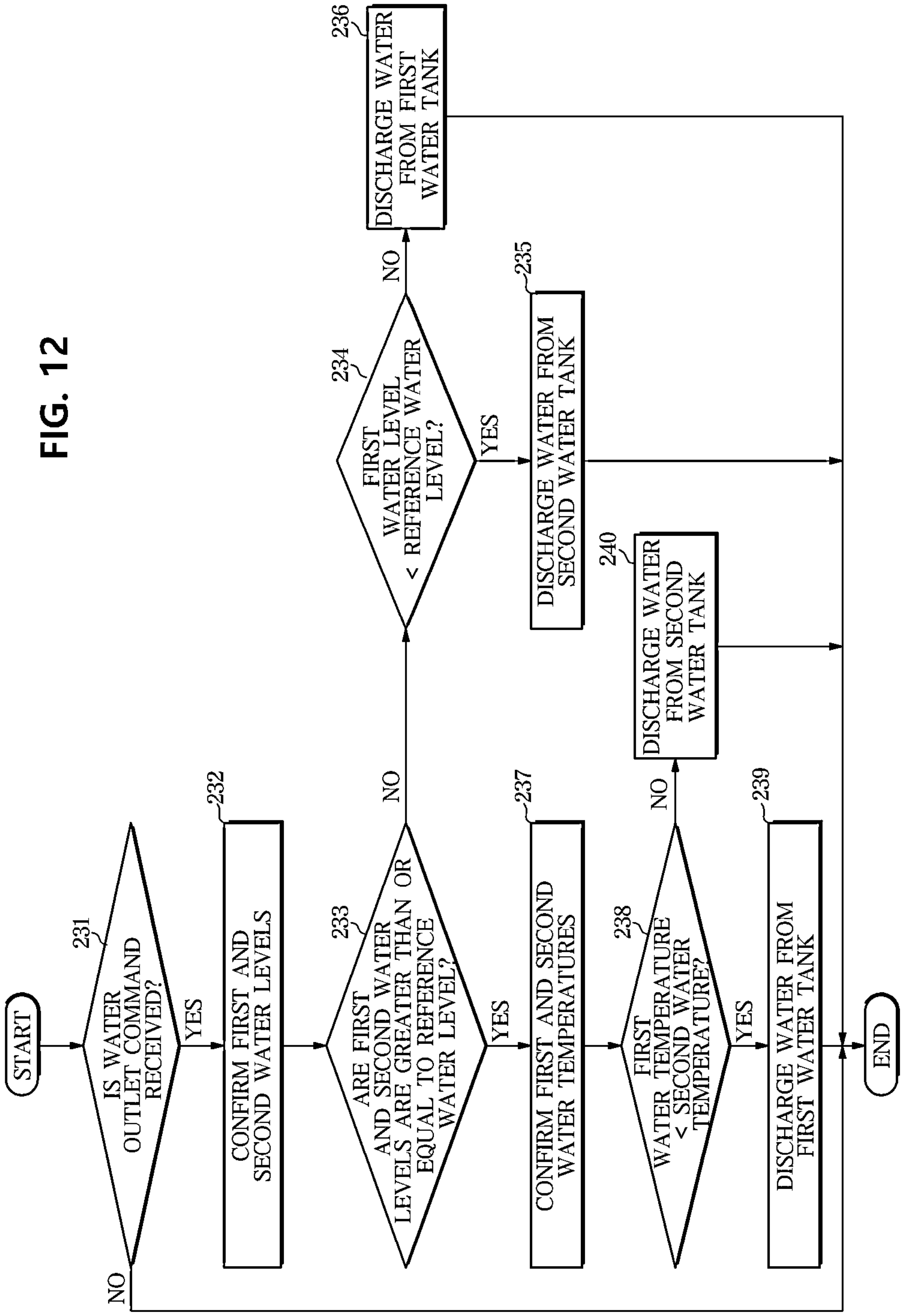
FIG. 12 is a flowchart illustrating operations of controlling water discharge in a water purifier according to an embodiment, which is a modified example of the flowchart of FIG. 11.

FIG. 12 is a flowchart illustrating operations of controlling water discharge in a water purifier according to an embodiment, which is a modified example of the flowchart of FIG. 11.

Water discharge control in a water purifier whose water tank is a cold water tank is described.

Based on receiving a water outlet command from the input interface 181 (231), the water purifier may determine whether one of the first water tank 121 and the second water tank 122 is being cleaned, and based on determining that neither the first water tank 121 nor the second water tank 122 is being cleaned, may confirm a first water level of the first water tank detected by the first water level sensor 163 and a second water level of the second water tank detected by the second water level sensor 164 (232). The water purifier may compare the first water level to a reference water level and compare the second water level to the reference water level.

The water purifier may determine whether both the first water level and the second water level are greater than or equal to the reference water level (233).

Because the water purifier according to the embodiment cleans only one of the first and second water tanks or discharges water from one of the first and second water tanks, water may be stored in the other water tank. In other words, any one of the first and second water tanks always satisfies the reference water level.

Accordingly, based on both the first and second water levels not being determined to be the reference water level, the water purifier may determine that one of the first and second water levels is less than the reference water level.

The water purifier may determine whether the first water level of the first water tank is less than the reference water level (234), and based on determining that the water level of the first water tank is less than the reference water level, may open the second water outlet valve and the water supply valve to allow water to be discharged from the second water tank (235).

The water purifier may open the first water outlet valve and the water supply valve to allow water to be discharged from the first water tank (236), based on determining that the first water level of the first water tank is greater than or equal to the reference water level. In this case, because the first water level of the first water tank is greater than or equal to the reference water level, the water purifier may determine that the second water level of the second water tank is less than the reference water level.

Based on determining that both the first and second water levels are greater than or equal to the reference water level, the water purifier may confirm a first water temperature of the first water tank detected by the first temperature sensor and a second water temperature of the second water tank detected by the second temperature sensor (237), may compare the first and second water temperatures to identify a lower water temperature among the first and second water temperatures (238), may identify a water tank corresponding to the identified water temperature, and may control the water outlet valve connected to the identified water tank and the water supply valve to be opened so as to allow water to be output from the identified water tank.

More specifically, the water purifier may determine whether the first water temperature is lower than the second water temperature, and based on determining that the first water temperature is lower than the second water temperature, may open the first water outlet valve and the water supply valve to allow water to be discharged from the first water tank (239).

The water purifier may open the second water outlet valve and the water supply valve to allow water to be discharged from the second water tank (240), based on determining that the second water temperature is lower than the first water temperature.

Figure 13:
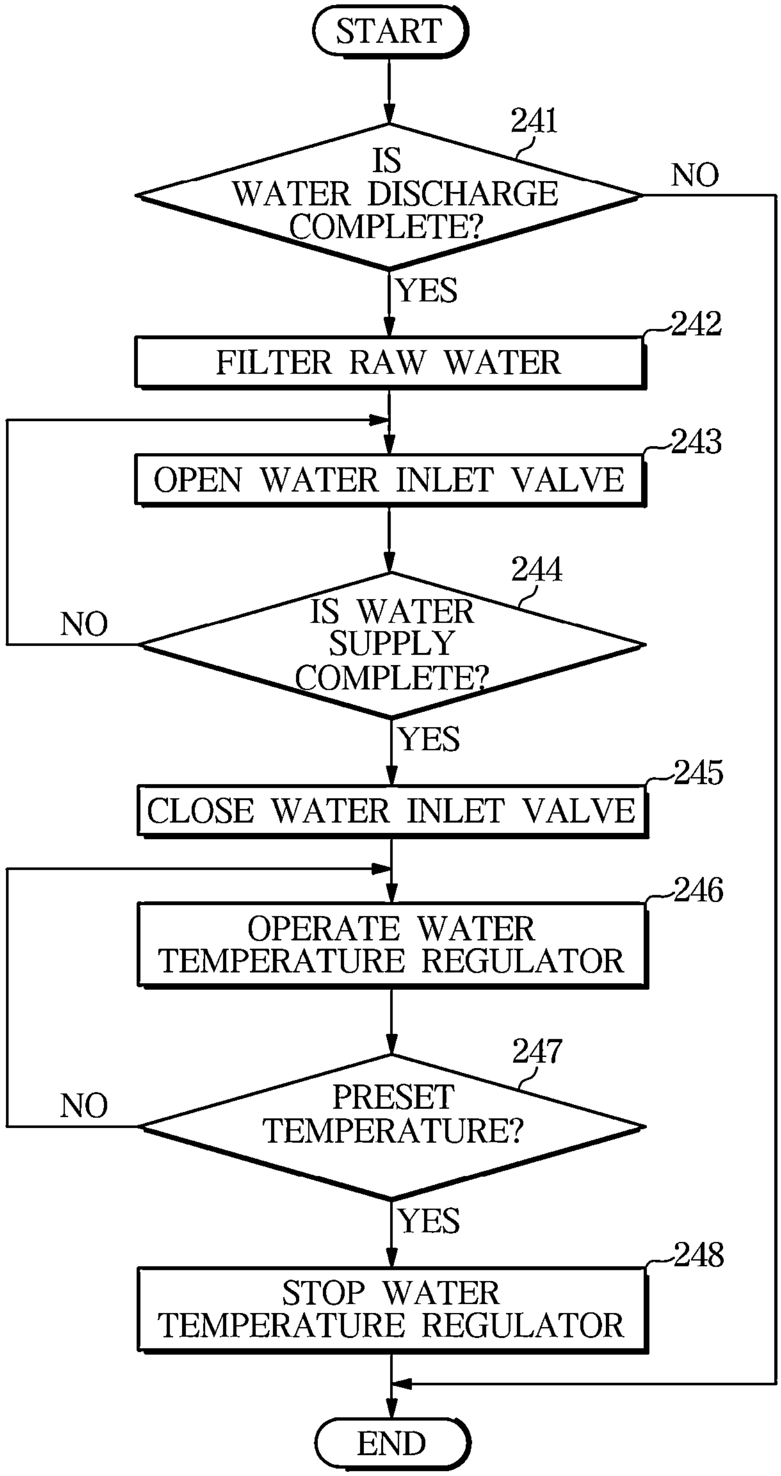
FIG. 13 is a flowchart illustrating operations of controlling water supply to a water tank of a water purifier according to an embodiment.

FIG. 13 is a flowchart illustrating operations of controlling water supply to a water tank of a water purifier according to an embodiment.

The water purifier may close an opened water outlet valve and water supply valve v4, based on determining that water discharge through one of the water tanks is complete (241).

The water purifier may determine completion of water discharge based on an opening time of the water outlet valve or an opening time of the water supply valve.

The water purifier may also determine completion of water discharge based on the amount of water supply received through the input interface 181 and the opening time of the water outlet valve.

The water purifier may supply raw water to the filter 110 to filter the raw water (242), based on determining that the water discharge from one of the water tanks is complete, and may open the water inlet valve v1 (243) to allow the water filtered by the filter 110 to be supplied to the one of the water tanks. In this instance, the water tank from which water is discharged may be an empty water tank or may contain a smaller amount of stored water than the water tank from which water is not discharged. Accordingly, water that has passed through the water inlet valve v1 may flow into the water tank from which water is discharged by pressure.

The water purifier may close the water inlet valve v1 (245), based on the determining that the supply of the filtered water is complete (244).

Determining that the supply of the filtered water is complete may include determining that a flow rate detected by the flowmeter 140 is a preset flow rate.

Determining that the supply of the filtered water is complete may include determining that an opening time of the water inlet valve v1 has reached a certain time. Here, the certain time corresponds to the amount of water to be supplied to the water tank and may be a preset time.

The water purifier may operate the water temperature regulator to change a temperature of water stored in the water tank (246), based on determining that the supply of the filtered water is complete.

In a case where the water tank is a cold water tank, the water purifier may cool the water stored in the water tank by operating the water temperature regulator.

In a case where the water tank is a hot water tank, the water purifier may heat the water stored in the water tank by operating the water temperature regulator 130.

The water purifier may detect the temperature of water detected by a temperature sensor positioned in the water tank, may determine whether the detected water temperature is a preset temperature (247), and may stop the operation of the water temperature regulator 130 (248), based on determining that the detected water temperature is the preset temperature.

For example, the water purifier may open the water inlet valve v1 to allow the filtered water to be supplied to the first water tank 121 based on completion of water discharge of the first water tank 121, and may close the water inlet valve v1 based on determining that the supply of the filtered water to the first water tank 121 is complete. Thereafter, the water purifier may adjust a temperature of the water stored in the first water tank 121 by operating the water temperature regulator 130. Thereafter, the water purifier may determine whether the temperature of the water in the first water tank 121 has reached a preset temperature based on a temperature detected by the first temperature sensor, and may stop the operation of the water temperature regulator 130 based on determining that the temperature of the water in the first water tank 121 has reached the preset temperature.

The water purifier may open the water inlet valve v1 to allow the filtered water to be supplied to the second water tank 122 based on completion of water discharge of the second water tank 122, and may close the water inlet valve v1 based on determining that the supply of the filtered water to the second water tank 122 is complete. Thereafter, the water purifier may adjust a temperature of the water stored in the second water tank 122 by operating the water temperature regulator 130. Thereafter, the water purifier may determine whether the temperature of the water in the second water tank 122 has reached a preset temperature based on a temperature detected by the second temperature sensor, and may stop the operation of the water temperature regulator 130 based on determining that the temperature of the water in the second water tank 122 has reached the preset temperature.

Meanwhile, the disclosed embodiments may be implemented in the form of a recording medium that stores instructions executable by a computer. The instructions may be stored in the form of program codes, and when executed by a processor, the instructions may create a program module to perform operations of the disclosed embodiments. The recording medium may be implemented as a computer-readable recording medium.

The computer-readable recording medium may include all kinds of recording media storing instructions that may be interpreted by a computer. For example, the computer-readable recording medium may be a Read Only Memory (ROM), a Random Access Memory (RAM), a magnetic tape, a magnetic disk, a flash memory, an optical data storage device, etc.

Although embodiments of the disclosure have been described with reference to the accompanying drawings, a person having ordinary skilled in the art will appreciate that other specific modifications may be easily made without departing from the technical spirit or essential features of the disclosure. Therefore, the foregoing embodiments should be regarded as illustrative rather than limiting in all aspects.

The invention claimed is:

1. A water purifier, comprising:

a water tank divided into a first water tank in which water is storable and a second water tank in which water is storable;

a water temperature regulator positioned between the first water tank and the second water tank so as to contact the water stored in the first water tank and the water stored in the second water tank, and configured to change a temperature of the water stored in the first water tank and a temperature of the water stored in the second water tank, the water temperature regulator including:

a refrigeration cycle including a compressor, an evaporator, an expansion valve, and a condenser, or a first cooling plate positioned so as to contact the water stored in the first water tank, a second cooling plate positioned so as to contact the water stored in the second water tank, and a thermoelectric element configured to transfer heat to the first cooling plate and the second cooling plate;

a first water outlet valve configured to output the water stored in the first water tank; and a second water outlet valve configured to output the water stored in the second water tank.

2. The water purifier of claim 1, further comprising:

a first agitator configured to agitate the water stored in the first water tank; and a second agitator configured to agitate the water stored in the second water tank.

3. The water purifier of claim 1, further comprising:

a sterilizer configured to sterilize water;

a sterilization valve connected to the sterilizer;

a first water outlet passage connected to the first water tank;

a second water outlet passage connected to the second water tank;

a connection passage connecting the first water outlet passage and the second water outlet passage; and a drain valve connected between the connection passage and a drain pipe and configured to be opened in response to cleaning of one of the first water tank and the second water tank.

4. The water purifier of claim 1, further comprising:

a filter configured to filter water and supply the filtered water to at least one of the first water tank and the second water tank;

a first water inlet passage connected to the first water tank;

a second water inlet passage connected to the second water tank; and a water inlet valve connected to the first water inlet passage, the second water inlet passage, and the filter.

5. The water purifier of claim 1, further comprising:

an input interface; and a processor configured to, based on receiving a water outlet command from the input interface while one water tank of the first water tank and the second water tank is being cleaned and another water tank of the first water tank and the second water tank is not being cleaned, open one of the first water outlet valve and the second water outlet valve which is configured to output the water stored in the another water tank.

6. The water purifier of claim 5, further comprising:

a sterilizer configured to sterilize water;

a sterilization valve connected to the sterilizer;

a first water outlet passage connected to the first water tank;

a second water outlet passage connected to the second water tank;

a connection passage connecting the first water outlet passage and the second water outlet passage; and a drain valve connected between the connection passage and a drain pipe, wherein the processor is configured to:

open one of the first water outlet valve and the second water outlet valve which is configured to output the water stored in the one water tank and the drain valve to discharge the water stored in the one water tank, based on the water stored in the one water tank being discharged from the one water tank, open the sterilization valve to supply the sterilized water from the sterilizer to the one water tank, and based on the sterilized water being supplied to the one water tank, close the one of the first water outlet valve and the second water outlet valve which is configured to output the water stored in the one water tank and the drain valve to store the sterilized water in the one water tank for a preset time to clean the one water tank.

7. The water purifier of claim 5, wherein the processor is further configured to:

based on an elapse of a reference time since the one water tank was cleaned, perform control to clean the another water tank.

8. The water purifier of claim 5, further comprising:

a first temperature sensor configured to detect a first temperature of the water of the first water tank; and a second temperature sensor configured to detect a second temperature of the water of the second water tank, wherein the processor is further configured to:

based on receiving the water outlet command from the input interface while the first water tank and the second water tank are not being cleaned, identify which of the first water tank and the second water tank contains water of a lower temperature by comparing the first temperature to the second temperature, and open one of the first water outlet valve and the second water outlet valve which is configured to output the water stored in the identified water tank.

9. The water purifier of claim 5, further comprising:

a first water level sensor configured to detect a first water level of the first water tank; and a second water level sensor configured to detect a second water level of the second water tank, wherein the processor is configured to:

based on receiving the water outlet command from the input interface while the first water tank and the second water tank are not being cleaned, identify which of the first water tank and the second water tank has a higher water level by comparing the first water level to the second water level, and open one of the first water outlet valve and the second water outlet valve which is configured to output the water stored in the identified water tank to output water from the identified water tank.

10. The water purifier of claim 5, further comprising:

a filter configured to filter water and supply the filtered water to at least one of the first water tank and the second water tank;

a first water inlet passage connected to the first water tank;

a second water inlet passage connected to the second water tank;

a water inlet valve connected to the first water inlet passage, the second water inlet passage, and the filter, and a drain valve configured to drain at least one of the first water tank and the second water tank, and wherein the processor is configured to:

based on the one water tank being cleaned, open the water inlet valve to supply the filtered water to the one water tank and open one of the first water outlet valve and the second water outlet valve which is configured to output the water stored in the another water tank and the drain valve to discharge the water stored in the another water tank, and based on the water stored in the another water tank being discharged from the another water tank, open the water inlet valve to supply the filtered water to the another water tank.

11. The water purifier of claim 1, wherein the water temperature regulator divides the water tank into the first water tank and the second water tank.

12. A method for controlling a water purifier including a water tank divided into a first water tank in which water is storable and a second water tank in which water is storable, a water temperature regulator positioned between the first water tank and the second water tank so as to contact the water stored in the first water tank and the water stored in the second water tank and configured to change a temperature of the water stored in the first water tank and a temperature of the water stored in the second water tank, a first water outlet valve configured to output the water stored in the first water tank, and a second water outlet valve configured to output the water stored in the second water tank, the method comprising:

based on receiving a water outlet command from an input interface and determining that the first water tank is being cleaned and the second water tank is not being cleaned, opening the second water outlet valve to output the water stored in the second water tank;

based on the water stored in the second water tank being output, opening a water inlet valve to supply water to the second water tank;

based on water being supplied to the second water tank, cooling the water stored in the second water tank with the water temperature regulator; and based on an elapse of a reference time since the first water tank was cleaned, controlling the second water tank to be cleaned, wherein a temperature of the water stored in the first water tank and a temperature of the water stored in the second water tank are adjusted to a same temperature by the water temperature regulator.

13. The method of claim 12, wherein the water purifier further includes a drain valve configured to discharge the water stored in at least one of the first water tank and the second water tank, a sterilizer configured to sterilize water, a sterilization valve connected to the sterilizer, a filter configured filter water and supply the filtered water to at least one of the first water tank and the second water tank, and the method further comprising:

cleaning the first water tank by:

opening the first water outlet valve and the drain valve to discharge the water stored in the first water tank, based on the water stored in the first water tank being discharged, closing the first water outlet valve and the drain valve, controlling the sterilizer to sterilize water, after the first outlet valve is closed, opening the sterilization valve to supply the sterilized water to the first water tank, opening the first water outlet valve and the drain valve to discharge the sterilized water from the first water tank; and based on the first water tank being cleaned, opening the water inlet valve to supply water filtered by the filter to the first water tank; and cooling the water stored in the first water tank with the water temperature regulator.

14. The method of claim 12, wherein the water purifier further includes a first water level sensor configured to detect a first water level of the first water tank, and a second water level sensor configured to detect a second water level of the second water tank, a first temperature sensor configured to detect a first temperature of the water of the first water tank, and a second temperature sensor configured to detect a second temperature of the water of the second water tank, and the method further comprising:

based on receiving the water outlet command from the input interface and determining that the first water tank and the second water tank are not being cleaned, detecting the first water level and the second water level, based on the detected first water level and the detected second water level, identifying which water tank of the first water tank and the second water tank has a water level that is greater than or equal to a reference water level, outputting water stored in the identified water tank, based on determining that both the first water level and the second water level are greater than or equal to the reference water level, detecting the first temperature and the second temperature, identifying which water tank of the first water tank and the second water tank is storing water of a lower temperature, and outputting the water stored in the water tank identified as storing water of the lower temperature.

* * * * *